(12) United States Patent
Hamaguchi et al.

(10) Patent No.: US 7,014,374 B2
(45) Date of Patent: Mar. 21, 2006

(54) PRINTING APPARATUS AND PRINTING METHOD FOR PERFORMING PRE-COMMUNICATION WITH AN EXTERNAL DEVICE

(75) Inventors: Yoshiharu Hamaguchi, Nagano-ken (JP); Yusuke Torigoe, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 63 days.

(21) Appl. No.: 10/670,120

(22) Filed: Sep. 25, 2003

(65) Prior Publication Data

US 2004/0218209 A1  Nov. 4, 2004

(30) Foreign Application Priority Data

| Sep. 25, 2002 | (JP) | ............................. 2002-279423 |
| Nov. 1, 2002 | (JP) | ............................. 2002-320578 |
| Apr. 28, 2003 | (JP) | ............................. 2003-123456 |

(51) Int. Cl.
*B41J 5/30* (2006.01)

(52) U.S. Cl. ......................... 400/62; 400/61; 358/1.15
(58) Field of Classification Search ............ 400/60–62, 400/70, 76; 358/1.9, 1.15
See application file for complete search history.

(56) References Cited

U.S. PATENT DOCUMENTS

| 2002/0172345 | A1 * | 11/2002 | Wu ....................... 379/220.01 |
| 2003/0081240 | A1 * | 5/2003 | Soto et al. .................. 358/1.15 |
| 2003/0133154 | A1 * | 7/2003 | Ohyama et al. ........... 358/1.15 |
| 2003/0222985 | A1 * | 12/2003 | Goto et al. .............. 348/207.2 |
| 2004/0090543 | A1 * | 5/2004 | Suehiro ................. 348/231.99 |

FOREIGN PATENT DOCUMENTS

| JP | 11341065 A | * 12/1999 |
| JP | 11355704 A | * 12/1999 |
| JP | 2001-290612 | 10/2001 |
| JP | 2003309618 A | * 10/2003 |
| JP | 2004013350 A | * 1/2004 |

* cited by examiner

*Primary Examiner*—Minh Chau
(74) *Attorney, Agent, or Firm*—Sughrue Mion, PLLC

(57) ABSTRACT

The present invention provides a printing method and the like with which high-quality and high-speed printing is possible. The printing method includes: a step of performing pre-communication with an external device before print data are obtained from the external device; a step of obtaining print data from the external device; a step of setting print conditions according to the content of the pre-communication; and a step of printing a medium based on the print data according to the print conditions that have been set.

20 Claims, 30 Drawing Sheets

| ID | | PRINT MODE | PAPER TYPE | PICTURE QUALITY | PAPER SIZE | LAYOUT | DETAILED SETTINGS | VALIDITY |
|---|---|---|---|---|---|---|---|---|
| ID₁ | a₁ | ONE FRAME | NORMAL PAPER | HIGH SPEED | A4 | NO BORDER | YES | VALID |
| | aₓ | ONE FRAME | NORMAL PAPER | HIGH QUALITY | POSTCARD | WITH BORDER | YES | INVALID |
| | aᵧ | ALL FRAMES | LABEL | HIGH QUALITY | A4 | FOUR PICTURES | YES | VALID |
| | ... | ... | ... | ... | ... | ... | ... | ... |
| ID₂ | a₂ | ONE FRAME | LABEL | HIGH SPEED | A4 | FOUR PICTURES | NO | VALID |
| ID₃ | a₃ | ONE FRAME | NORMAL PAPER | HIGH QUALITY | A4 | NO BORDER | YES | VALID |
| ID₄ | a₄ | ONE FRAME | NORMAL PAPER | HIGH SPEED | A4 | NO BORDER | NO | VALID |

PRIORITY ORDER: LOW ← → HIGH (HIERARCHY)

FIG. 17

| | DEFAULT (CARD) | CAMERA (USB) | BIP | BPP |
|---|---|---|---|---|
| LAYOUT | ONE PICTURE, NO BORDER | ONE PICTURE, NO BORDER | ONE PICTURE, NO BORDER | ONE PICTURE, WITH BORDERS |
| SIZE | A4 | L PRINT | L PRINT | A4 |
| TYPE | PHOTOGRAPHIC PAPER | PHOTOGRAPHIC PAPER | PHOTOGRAPHIC PAPER | NORMAL PAPER |
| IMAGE PROCESSING | PIM | APF | PIM | NONE |

FIG. 22

DEFAULT SCREEN (SCREEN FOR CARD)

| | |
|---|---|
| LAYOUT | : ONE PICTURE, NO BORDER |
| PAPER SIZE | : A4 |
| PAPER TYPE | : PHOTOGRAPHIC PAPER |
| IMAGE PROCESSING | : PRINT IMAGE MATCHING |

2080 — LAYOUT
2081 — PAPER SIZE
2082 — PAPER TYPE
2083 — IMAGE PROCESSING

FIG. 24

SCREEN FOR CAMERA (USB CONNECTED)

| | | |
|---|---|---|
| LAYOUT | : | ONE PICTURE, NO BORDER |
| PAPER SIZE | : | L PRINT |
| PAPER TYPE | : | PHOTOGRAPHIC PAPER |
| IMAGE PROCESSING | : | AUTO PHOTO FINE |

2080 — LAYOUT
2081 — PAPER SIZE
2082 — PAPER TYPE
2083 — IMAGE PROCESSING

FIG. 25

```xml
<?xml version="1.0"?>
<dps xmlns="http://www.xxxx">
  <startJobRequest>
    <job>
      <jobConfig>
        <quality>01000000</quality>
        <paperSize>02010000 </paperSize>
        <paperType>03020000</paperType>
        <fileType>04150000</fileType>
        <data>05010000</data>
        <fileName>06000000</fileName>
        <imageOptimize>07000000</imageOptimize>
        <layoutItem>08010000 </layoutItem>
      </jobConfig>
      <printInfo>
        <image>
          <imageID>00000001</imageID>
          <imageDate>2002/05/30</imageDate>
        </image>
      </printInfo>
    <job>
  </startJobRequest>
</dps>
```

FIG. 26

```
<?xml version="1.0"?>
<dps xmlns="http://www.xxxx">
  <getFileRequest>
    <fileID>00000001</fileID>
    <buffPtr>00100000</buffPtrt>
  </getFileRequest>
</dps>
```

FIG. 27

BIP SCREEN (BLUETOOTH PHOTOGRAPH SCREEN)

LAYOUT : ONE SIDE, NO BORDER — 2080
PAPER SIZE : L PRINT — 2081
PAPER TYPE : PHOTOGRAPHIC PAPER — 2082
IMAGE PROCESSING: PRINT IMAGE MATCHING — 2083

FIG. 29

BPP SCREEN (BLUETOOTH TEXT SCREEN)

| | | |
|---|---|---|
| LAYOUT | : | ONE SIDE, WITH BORDERS |
| PAPER SIZE | : | A4 |
| PAPER TYPE | : | NORMAL PAPER |
| IMAGE PROCESSING: | | NONE |

2080 — LAYOUT
2081 — PAPER SIZE
2082 — PAPER TYPE
2083 — IMAGE PROCESSING

FIG. 30

PRINTING APPARATUS AND PRINTING METHOD FOR PERFORMING PRE-COMMUNICATION WITH AN EXTERNAL DEVICE

CROSS-REFERENCE TO RELATED APPLICATION

The present application claims priority upon Japanese Patent Application No. 2002-279423 filed on Sep. 25, 2002, Japanese Patent Application No. 2002-320578 filed on Nov. 1, 2002, and Japanese Patent Application No. 2003-123456 filed on Apr. 28, 2003.

BACKGROUND OF THE INVENTION

1. Field of the Invention

The present invention is related to printing methods and printing apparatuses for printing on a medium.

2. Description of the Related Art

To print using a printer that is connected to a computer, a printer driver on the computer creates print data specific for the model of the printer, the print data are transmitted from the computer to the printer, and the printer carries out printing based on the print data that are received. The printer driver creates print data in accordance with the content to be printed so that printing is carried out under optimal conditions. For example, if text is to be printed, then the printer driver creates print data in such a manner that the printer carries out printing under optimal conditions for printing text.

With printing using such printer drivers, however, it is necessary to install a printer driver that is compatible with the printer model onto the computer. That is, if a computer is to carry out printing using different printer models, it is necessary for a user to install printer drivers for the various printer models onto the computer.

Accordingly, to obviate the need to install printer drivers for each printer model, attempts have been made to standardize the format of data that are transmitted from the computer side to the printer side, for example. When transmitted data are standardized, however, it is not possible to include detailed information relating to the print conditions. For that reason, the printers carry out printing in accordance with conditions set in advance on the printer side.

However, the optimal print conditions are different for the printing of text and the printing of images such as natural pictures, for example. For that reason, data that are received by the printer cannot be printed at high quality just by printing them according to pre-set conditions.

On the other hand, when the printer analyzes the nature of the data that are received in order to perform printing that is suited to the content of the data, a large computational burden is placed on the printer, and this increases the time of the printing process.

Various types of mobile devices have been developed to date, including PDA (Personal Digital Assistance) and portable telephones. Also, these mobile devices are capable of transmitting obtained image data and character data that have been taken in to a printer wirelessly by an internal antenna. The printer receives the image data or the character data and prints out these data.

Bluetooth is one method of such wireless communication. It allows printing to be achieved without requiring a direct connection to the printer via cable (for example, Tekunoroji kaitai shinsho, Bluetooth gijutsu kaisetsu gaido (Technology New Reader: A Guide to Bluetooth Technology), authored by MIYAZU Kazuhiro and edited by Nippon Ericsson K. K., published May 25, 2001 by K. K. Ric Telecom).

Conversely, mobile devices have also conventionally been connected to a printer through cable so as to allow printing.

However, although image data or character data sent from a mobile device can be printed by a printer, it is necessary to set the print conditions at the printer side, and thus the task of setting must be carried out for each mobile device (for each data type), and there has been the problem that it is troublesome to perform this task of setting. Another factor contributing to this is that the functionality of some mobile devices is insufficient, with sufficient quality to allow the print conditions to be set not yet being achieved.

Furthermore, advances in communications technology have made it possible for a plurality of mobile devices to be connected to a single printer simultaneously. Thus, when the print settings are changed on the printer side each time, printing cannot be executed smoothly, and this led to the problem that the task of printing could not be carried out efficiently.

Moreover, as the number of devices that are connected to the printer, including those connected by cable, increases, it becomes necessary to change the print settings so that optimal printing can be attained for those devices.

When there are numerous types of devices, however, there are instances where printing is performed using previous settings, such as when the user forgets to change the print settings, and this results in printing that was not what a user had anticipated. A conceivable way to prevent this is to input settings information each time on the setting screen of the printer, but if printing is to be carried out wirelessly, then to do so precludes the meaning of adopting a wireless format.

SUMMARY OF THE INVENTION

It is an object of the present invention to provide printing methods and the like that allow high-quality and high-speed printing in a case where it is necessary to set the print conditions on the printer side in the above-mentioned manner.

A primary invention for solving the foregoing problems is a printing method having the following steps.

These are:

a step of performing pre-communication with an external device before print data are obtained from the external device;

a step of obtaining print data from the external device;

a step of setting print conditions according to the content of the pre-communication; and a step of printing a medium based on the print data according to the print conditions that have been set.

Also, another primary invention is a printing apparatus comprising the following components.

These are:

a reception section for receiving data from an external device, wherein the reception section carries out pre-communication with the external device before obtaining print data from the external device, a print conditions setting section for setting print conditions for print data obtained by the reception section, wherein the print conditions setting section sets print conditions in accordance with the content of the pre-communication, and a print head for printing a medium based on the print data in accordance with the print conditions that have been set.

BRIEF DESCRIPTION OF THE DRAWINGS

FIG. 17 is a table diagram showing the setting values table stored in the ROM.

FIG. 22 is a table showing the reproduction conditions that are stored in the EEPROM.

FIG. 24 is the default print settings screen that is displayed on the control panel.

FIG. 25 is the camera (USB) settings screen that is displayed on the control panel.

FIG. 26 is an example of the XML script that is sent in the DPS protocol.

FIG. 27 is an example of the XML script that is sent in the DPS protocol.

FIG. 29 is the BIP print settings screen that is displayed on the control panel.

FIG. 30 is the BPP print settings screen that is displayed on the control panel.

DETAILED DESCRIPTION OF THE INVENTION

Figure 1:
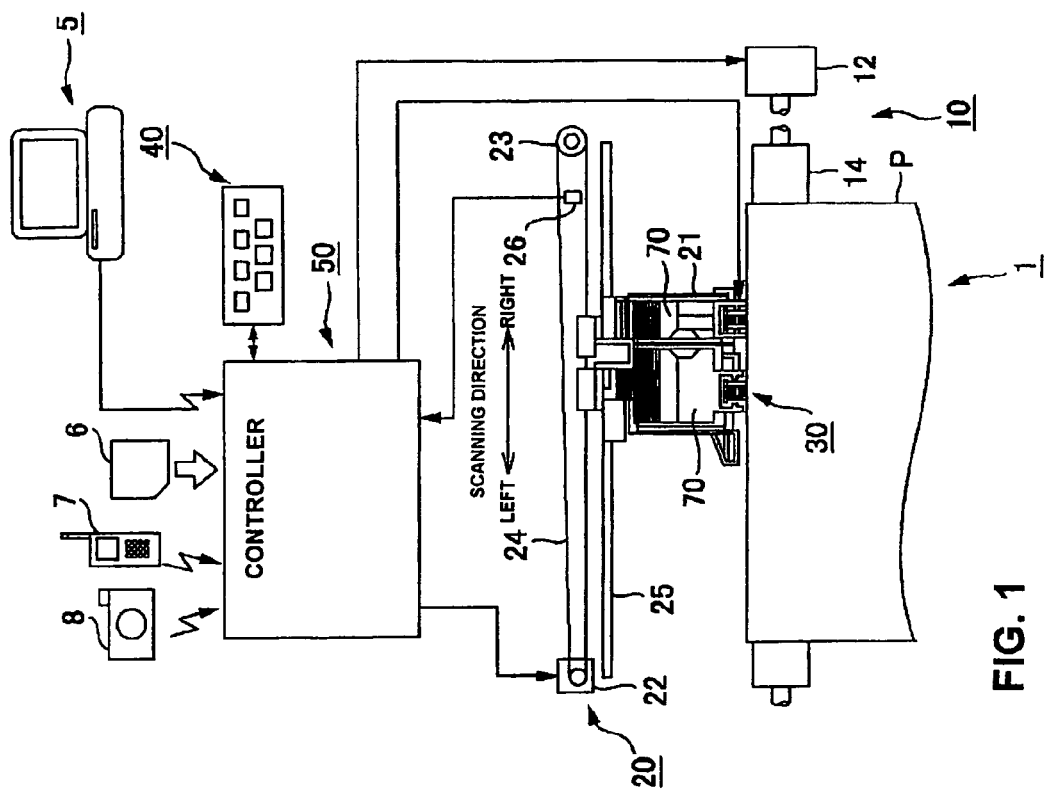
FIG. 1 is a diagram that schematically shows the configuration of a print system provided with a printer.

At least the following matters will be made clear by the description in the present specification and the accompanying drawings.

A printing method comprises:

a step of performing pre-communication with an external device before print data are obtained from the external device;

a step of obtaining print data from the external device;

a step of setting print conditions according to the content of the pre-communication; and a step of printing a medium based on the print data according to the print conditions that have been set.

Also, in this printing method, it is preferable that a reception unit for receiving the print data is specified from among a plurality of reception units depending on the content of the pre-communication, and that the print conditions are set according the reception unit that is specified.

With these printing methods, high-quality and high-speed printing becomes possible.

Also, in the printing method, it is preferable that the reception unit receives print data from an external device wirelessly or via a wire.

With this printing method, the print conditions are set corresponding to a reception unit that is constituted by hardware.

Also, in the printing method, it is preferable that the reception unit is a logic channel that has been set logically. With this printing method, the print conditions are set in correspondence with a logic reception unit.

Also, it is preferable that the logic channel is set to correspond to a transfer format that is used when receiving data from the external device. Since the transfer format of the data and the content of the data that are received correspond to one another, if the logic channel is set to correspond to the transfer format of the data, then it is possible to set the print conditions in correspondence with the logic reception unit.

It is also possible for the transfer format to be at least one of a profile for transferring text data and a profile for transferring image data. Since the print conditions for text and the print conditions for images are different, with this printing method it is possible to quickly print text and images at high quality.

In the printing method, it is also preferable that in the pre-communication, information designating the reception unit is received from an external device, and that the print conditions are set in correspondence with the information designating the reception unit that is received. With this printing method, the print conditions are set corresponding to the reception unit that has been designated.

It is also preferable that a lookup table correlating the reception unit and the print conditions is prepared, and that the print conditions are set based on the information designating the reception unit that is received and the lookup table. With this printing method, print conditions that correspond to the reception unit receiving the data are set.

It is also preferable that the information designating the reception unit is an identifier of the reception unit, and that the print conditions are set in accordance with the identifier that is received. With this printing method, the print conditions are set corresponding to the identifier.

It is also possible for an identifier of the reception unit to be sent to the external device before information designating the reception unit is received from the external device. With this printing method, the external device sending the data can designate the identifier of the reception unit of the printing method and then send data.

Also, in the printing method, it is preferable that at least one operation of an operation of carrying a medium, an operation of ejecting liquid onto the medium, and an operation of a carriage, is set in accordance with the reception unit that has received the print data. By setting the operations of these units it is possible to carry out printing using print conditions that are suited for the content of the data.

In the printing method it is also preferable that printing is carried out with respect to the medium based on pixel data that are created based on the print data, and that the pixel data are created based on the print data according to print conditions that have been set in correspondence with the reception unit that has received the print data.

With this printing method, pixel data are created in correspondence with the reception unit receiving the data. That is, the process for creating pixel data differs depending on the reception unit receiving the data. Thus, pixel data that are in correspondence with the content of the data are created.

It is also preferable that print conditions are prepared for each identifier, that at least one identifier is obtained from an external device, and that print conditions are chosen from the print conditions that have been prepared in advance based on an identifier that is received from the external device.

With this printing method, appropriate print conditions are selected from the printing conditions that are prepared in advance, and it is possible for the medium to be printed based on the print data according to the print conditions that have been selected.

It is also preferable that a plurality of the identifiers are arranged in a hierarchy corresponding to their content, that a priority order has been set for the identifiers arranged in the hierarchy, and that the print conditions are chosen based on the priority order.

With this printing method, the priority order is set for the identifiers that have been arranged in a hierarchy, and the print conditions are set based on that priority order, and thus even if there are a plurality of identifiers, which identifier should be used to set the printing conditions is apparent.

Also, it is preferable that communication with the external device is carried out through wireless communication.

When external devices can be communicated with wirelessly, it is often the case that many external devices are communicated with. However, since the print conditions are set based on the identifier of the external device, even in such cases it is not time consuming to set the print settings.

It is also preferable that at least one of a protocol identifier, a profile identifier, a model name identifier, and a fixed address identifier is obtained from the external device, and that based on the identifier that is received from the external device, print conditions are selected from the print conditions prepared in advance.

It is also preferable that the hierarchy is arranged such that the priority order of the protocol identifier is lowest.

It is also preferable that the hierarchy is arranged such that the priority order of the fixed address identifier is highest.

It is also preferable that the hierarchy is arranged such that the priority order is successively highest in order from the protocol identifier, the profile identifier, the model name identifier, and the fixed address identifier.

It is also preferable that a communications protocol is specified in accordance with the content of the pre-communication, and that the print conditions are set in accordance with the communications protocol that has been specified.

It is also preferable that different print conditions are set for a Direct Print Service protocol of a Universal Serial Bus, a Basic Imaging Profile of Bluetooth, and a Basic Printing Profile of Bluetooth.

It is possible to further include the following steps. These are:

a step of displaying predetermined print conditions on a screen, a step of, when the print conditions are set in accordance with the communications protocol that was specified, displaying the print conditions that were set on the screen in place of the predetermined print conditions, and a step of displaying the predetermined print conditions on the screen in place of the print conditions that were set after printing has been carried out with respect to a medium based on the print data in accordance with the print conditions that were set.

For example, it is possible that when image data are to be communicated through Bluetooth, the print conditions corresponding to the communications protocol are displayed on the screen in place of the default print conditions in accordance with that communications protocol, and then after printing has been carried out according to these print settings, the default print conditions are displayed on the screen in place of the print conditions corresponding to that communications protocol.

It is also preferable that a printing apparatus comprises:

a reception section for receiving data from an external device, wherein the reception section carries out pre-communication with the external device before obtaining print data from the external device, a print conditions setting section for setting print conditions for print data obtained by the reception section, wherein the print conditions setting section sets print conditions in accordance with the content of the pre-communication, and a print head for printing a medium based on the print data in accordance with the print conditions that have been set.

It should be noted that in addition to these printing methods and printing apparatus, methods for manufacturing printed materials, programs, computer-readable recording media, and computer systems are also disclosed below.

=First Embodiment=

===Configuration of the Printer===

Figure 2:
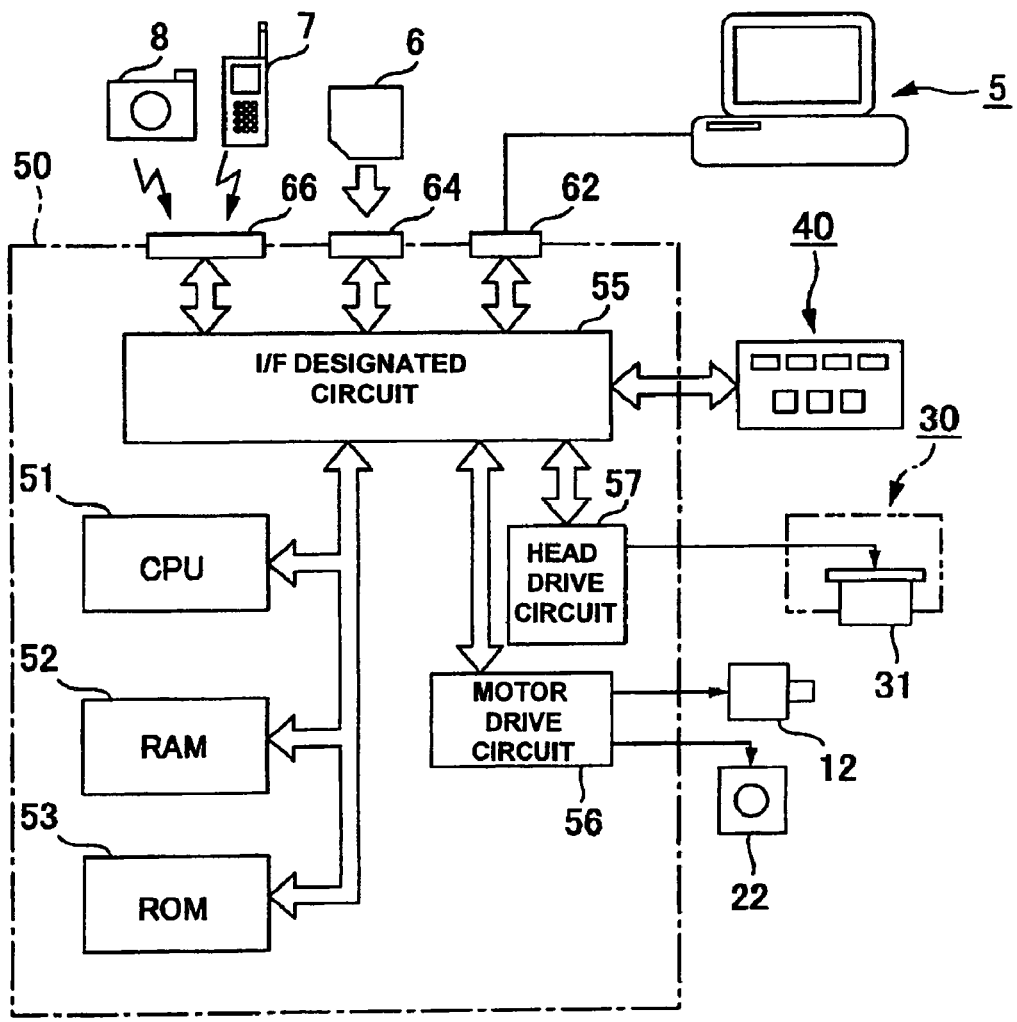
FIG. 2 is a block diagram focusing on the controller.

FIG. 1 is a diagram showing an overview of the configuration of a print system provided with an inkjet printer. FIG. 2 is a block diagram showing the configuration of the inkjet printer, focusing on its control circuit.

An inkjet printer 1 (hereinafter, referred to as "printer 1") is a printing apparatus for ejecting ink from nozzles to form dots at ink land positions so as to print an image onto a print paper P. The printer 1 is provided with a carrying unit 10, a carriage unit 20, a head unit 30, a control panel 40, and a controller 50.

The carrying unit 10 is provided with a mechanism for carrying the print paper P. In other words, the carrying unit 10 carries the print paper P up to a printable position. Then, when printing the print paper P, the carrying unit 10 intermittently carries the print paper P by a predetermined carry amount (it should be noted that the direction in which the carrying unit 10 carries the print paper P is referred to as the carrying direction). The carrying unit 10 has a carry motor 12 and a carry roller 14. The carry motor 12 generates a rotational drive force. The carry roller 14 is rotated by the rotational drive force of the carry motor 12 and carries the print paper P in the carrying direction. The carrying unit 10 also has gears (not shown) for transmitting the rotational drive force of the carry motor 12 to the carry roller 14.

The carriage unit 20 is provided with a mechanism for making a carriage move back and forth in a scanning direction. That is, the carriage unit 20 moves the carriage in the scanning direction so as to move the nozzles that eject ink. It should be noted that the scanning direction is the direction parallel to the left to right direction of FIG. 1, and is perpendicular to the carrying direction. The carriage unit 20 has a carriage 21, a carriage motor 22, a pulley 23, a belt 24, a guide 25, and a position sensor 26. The carriage 21 can be moved back and forth in the scanning direction. Also, inkjet cartridges 70 for accommodating ink can be mounted to the carriage 21. The carriage motor 22 generates a drive force for moving the carriage 21 in the scanning direction. The carriage motor 22 can switch between forward rotation and reverse rotation so that the carriage 21 can move back and forth in the scanning direction. The pulley 23 is attached to the rotation shaft of the carriage motor 22 and is rotated by the carriage motor 22. The belt 24 is driven by the pulley 23. A portion of the belt 24 and a portion of the carriage 21 are joined to one another, and thus when the carriage motor 22 rotates, the belt 24 is driven via the pulley 23 and the carriage 21 moves in the scanning direction. The guide 25 is a rod-shaped member having a circular cross-section, and is a guide member for guiding the carriage 21 in the scanning direction. The position sensor 26 is for detecting the original position (the original position in the scanning direction) of the carriage 21. The carriage unit 20 also has a linear encoder (not shown), for example. The linear encoder is for detecting the relative position (the relative position in the scanning direction) of the carriage motor 21 with respect to the original position.

The head unit 30 is a device for ejecting ink onto the print paper P, and has a head 31 (print head) that is provided with a plurality of nozzles and drive elements. The head 31 is provided in a single unit with the carriage 21, and thus when the carriage 21 moves in the scanning direction the head 31 similarly moves in the scanning direction. Consequently, when ink is intermittently ejected from the nozzles of the head 31 while the carriage 21 is moving, droplets of ink land in succession on the print paper P, forming rows of dots in lines on the print paper P. The head unit 30 also has an introduction duct and an ink channel (described later), for example.

The control panel 40 has a plurality of control buttons and a lamp constituted by a light-emitting element such as an LED. The user, by pressing the control buttons, can directly input print conditions to the printer 1. The lamp, for example, is an LED that emits red light, and is used to notify the user of abnormalities, for example.

The controller 50 controls the printer 1. In particular, the controller 50 sends and receives signals with respect to the carrying unit 10, the carriage unit 20, the head unit 30, and the control panel 40 described above so as to control these units. The controller 50 is provided with a CPU 51, a RAM 52, and a ROM 53, and constitutes an arithmetic and logic circuit. The CPU 51 is for carrying out the overall control of the printer 1, and sends control commands to the units. The RAM 52 reserves a working region for the CPU 51. The ROM 53 is a storage means for storing programs. The various operations of the printer 1 that are discussed later are achieved by the programs stored in the ROM 53.

The ROM 53 also stores information on the printer font. When the printer 1 receives character code (information specifying characters), the printer 1 references the information stored in the ROM 53 and outputs corresponding characters or patterns. The ROM 53 also stores information on the parameters for controlling the operations of each unit in the printer (control parameters for printing text and control parameters for printing images).

The controller 50 has an I/F dedicated circuit 55, a motor drive circuit 56, and a head drive circuit 57. The I/F dedicated circuit 55 is a dedicated interface. The motor drive circuit 56 is connected to the I/F dedicated circuit 55 and drives the carry motor 12 and the carriage motor 22 based on signals from the CPU 51. The head drive circuit 57 is connected to the I/F dedicated circuit 55 and drives the head 31 based on signals from the CPU 51.

The controller 50 sends and receives signals to and from a computer 5, which is an external device, via a port 62 for an external device I/F circuit. The port 62 is a port for a wired connection through USB cable, for example, and functions as a connector (or a reception section for receiving data) for sending and receiving information to and from the computer 5. A printer driver for the printer 1 is installed in the computer. The printer driver for the printer 1 receives commands entered through operation of input means such as a keyboard or a mouse, and functions as a user interface for presenting various information about the printer 1 to the user through a screen display on a display. The computer 5 transfers text data or image data in an application program such as a word processor to the printer driver, which is operated on the computer 5. The printer driver creates print data based on the text data or the image data that are received, and sends the print data to the printer 1. Here, print data are data that include raster data (also referred to as bit-map data) for creating a print image. When the printer 1 receives the print data from the computer 5, it carries out printing with respect to the print paper P based on the print data that are received.

Also, the controller 50 sends and receives signals to and from an external memory 6, which is a storage medium, via a port 64 for an external memory I/F circuit. The port 64 is a port constituted by a card insert slot, for example, for connecting to an external memory 6, and functions as a connector (or a reception section for receiving data) for sending and receiving signals to and from the external memory 6. The external memory 6 stores image data captured on a digital camera, for example. The external memory 6 storing the image data is inserted into a slot provided in the printer 1. The printer 1 reads in the image data in the external memory 6 that has been inserted into the slot, and can print the image data without going through the computer 1, for example.

The controller 50 sends and receives signals to and from an external device such as a portable telephone 7 or a digital camera 8 wirelessly via a port 66 for a wireless I/F circuit. The port 66 functions as a connector (or a reception section for receiving data) for data that are communicated wirelessly. The wireless I/F circuit port 66 can be wirelessly connected to various external devices. For this reason, more than one type of data can be transferred from this port. In the following description of the present embodiment, text data are transferred from the portable telephone 7 and image data are transferred from the digital camera 8.

The controller 50 also functions as a print conditions setting portion for setting the print conditions for the print data obtained by the reception section, and as will be discussed later, the controller 50 sets the print conditions in accordance with the content of pre-communication by the reception section.

Text data are transferred to the printer 1 from the portable telephone 7 based on a character data transfer protocol (the transfer format for character data transfer). The character data that are transferred from the portable telephone 7 are data that use character code. When the printer 1 receives the text data by way of the character data transfer protocol, it stores the text data in a buffer region on the RAM 52. The CPU 51 reads the character code of the text data stored on the RAM 52, locates the printer font on the ROM 53 corresponding to the character code, and then creates raster data corresponding to the character code in the text data. The printer fonts are specifically raster data that have been prepared for each type of font used by the printer 1 (for example, mincho and gothic) and for each character (hiragana, roman letters, numbers, and kanji, for example). It should be noted that it is also possible for the CPU 51 to execute rasterization by Bezier curve or by spline curve and then perform additional processing in order to create final raster data.

Image data are transferred to the printer 1 from the digital camera 8 based on an image data transfer protocol (transfer format for image data). The image data that are transferred from the digital camera 8 are image data of the JPEG format or RGB image data, for example. If the image data that are received from the digital camera 8 are of the JPEG format, then the printer 1 converts the JPEG image data into RGB image data. The printer 1 then creates print data including CMYK raster data based on the RGB image data.

===Configuration of the Head===

Figure 3A:
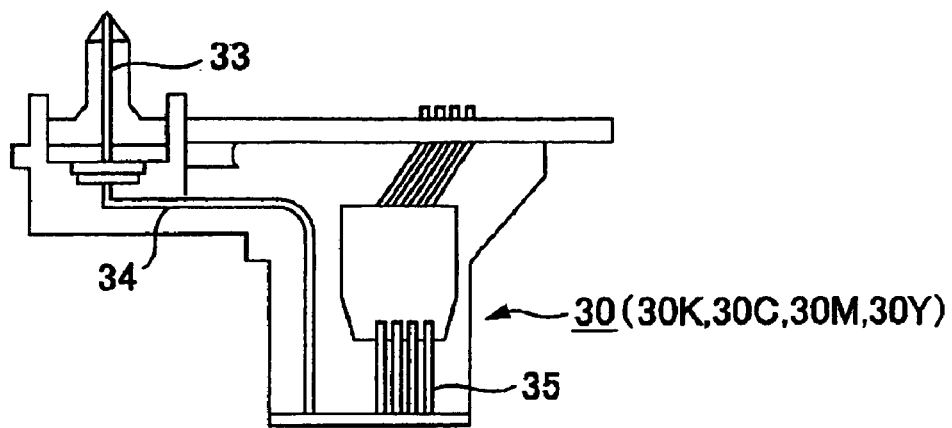
FIG. 3A is an explanatory diagram showing a schematic configuration of the inside of the head.
Figure 3B:
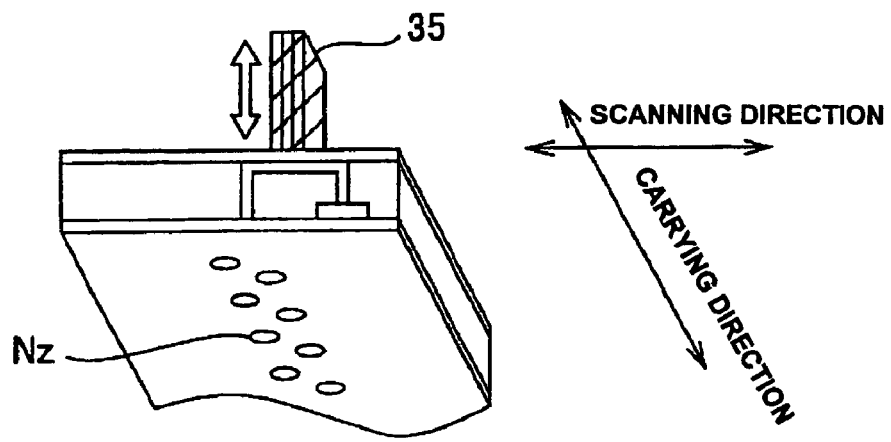
FIG. 3B is a perspective view of the primary elements of the head.
Figure 4:
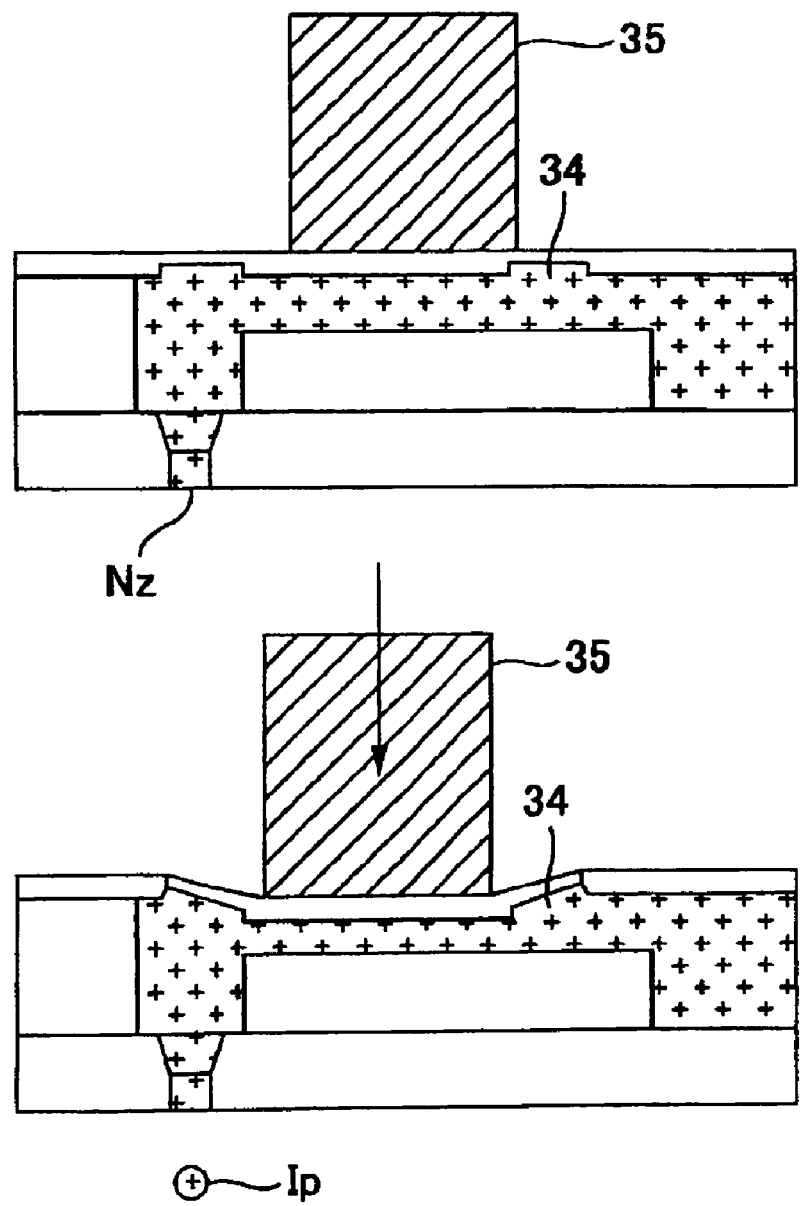
FIG. 4 is an explanatory diagram showing the structure of the piezo elements and the nozzles.
Figure 5:
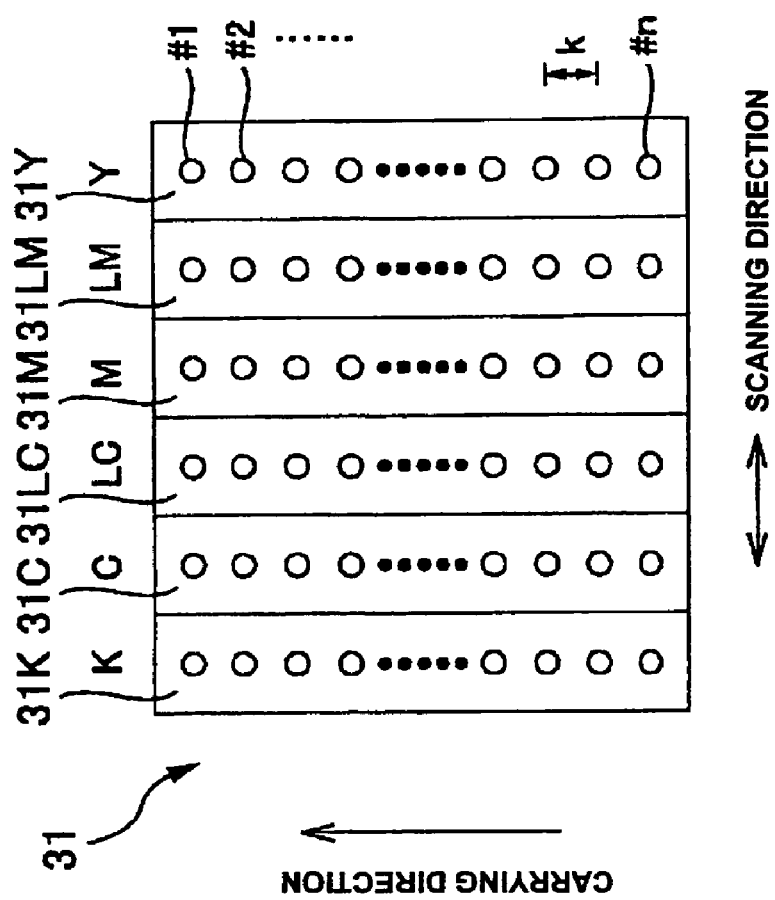
FIG. 5 is an explanatory diagram showing the arrangement of the nozzles in the head.

FIG. 3A is an explanatory diagram schematically showing the configuration of the inside of the head. FIG. 3B is a perspective view showing the main elements of the head. FIG. 4 is an explanatory diagram showing the structure of a piezo element 35 and a nozzle Nz. FIG. 5 is an explanatory diagram showing the arrangement of the nozzles Nz in the head.

To the carriage 21 can be mounted a cartridge 70K for black ink (K), a cartridge 70C for dark cyan ink (C), a cartridge 70LC for light cyan ink (LC), a cartridge 70M for dark magenta ink (M), a cartridge 70LM for light magenta ink (LM), and a cartridge 70Y for yellow ink (Y). Since the configuration of the head for each color of ink is substantially the same, description thereof is partially omitted in the following description.

Six head units 30 (30K, 30C, 30LC, 30M, 30LM, 30Y) are provided on the lower side of the carriage 21. Each head unit 30 has an introduction duct 33 and an ink channel 34. The introduction duct 33 is inserted into the connection aperture (not shown) provided in the cartridge 70 when the cartridge 70 is mounted to the carriage, and supplies ink to the head unit 30. The ink channel 34 is a channel for guiding ink that has been supplied from the cartridge 70 to the head 31.

The head 31 is provided with a plurality of nozzles Nz. Each nozzle Nz is provided with a piezo element 35 that serves as a drive element for driving the nozzle and causing it to eject ink.

The piezo elements 35 are elements whose crystalline structure is distorted by the application of a voltage and very quickly convert this electrical energy to mechanical energy. When a voltage of a predetermined duration is applied between electrodes provided at either end of the piezo element 35, the piezo element 35 expands while the voltage is being applied, changing the shape of the inner wall of the ink channel 34. As a result, the volume of the ink channel 34 shrinks in accordance with the expansion of the piezo element 35, and an amount of ink that corresponds to this shrinkage is ejected from the tip of the nozzle Nz as ink droplets Ip. The ink droplets Ip land on the print paper P, forming dots on the print paper.

The plurality of nozzles are arranged in rows in the carrying direction in the bottom surface of the head 31. These nozzles are lined up at a constant spacing. Also, each nozzle is assigned a number (#1 to #n) that decreases the more downstream the nozzle is. A row of nozzles arranged in this manner is provided in the bottom surface of the head for each color. The various color nozzle rows are disposed adjacent to one another in the scanning direction.

It should be noted that when printing, the carrying unit 10 intermittently carries the print paper P by a predetermined carry amount, and between these intermittent carries the carriage 21 moves in the scanning direction and ink droplets are ejected from the nozzles. In this embodiment, the spacing of the nozzles is 180 dpi.

===Driving of the Head===

Figure 6:
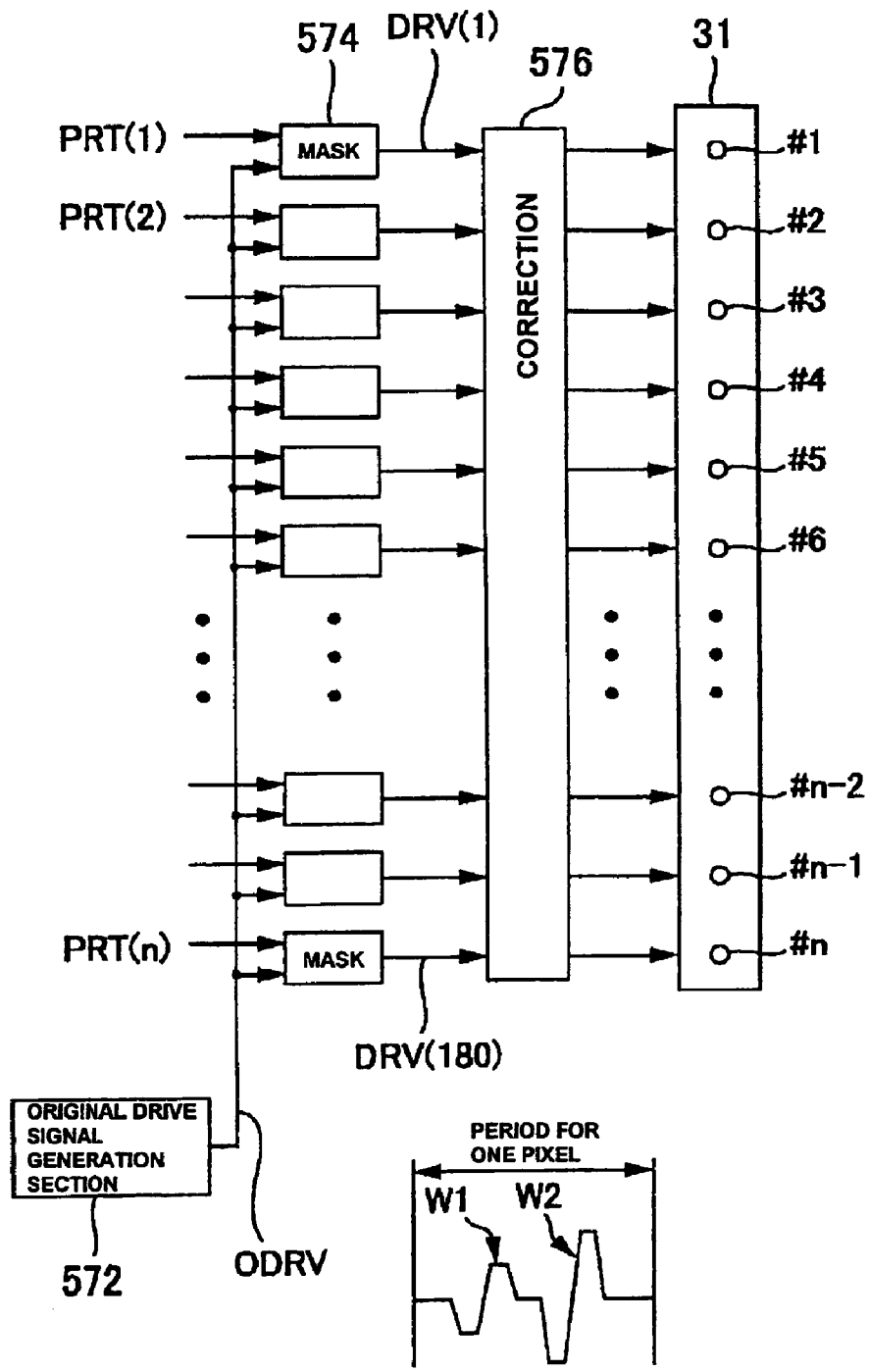
FIG. 6 is a block diagram showing the configuration within the head drive circuit.
Figure 7:
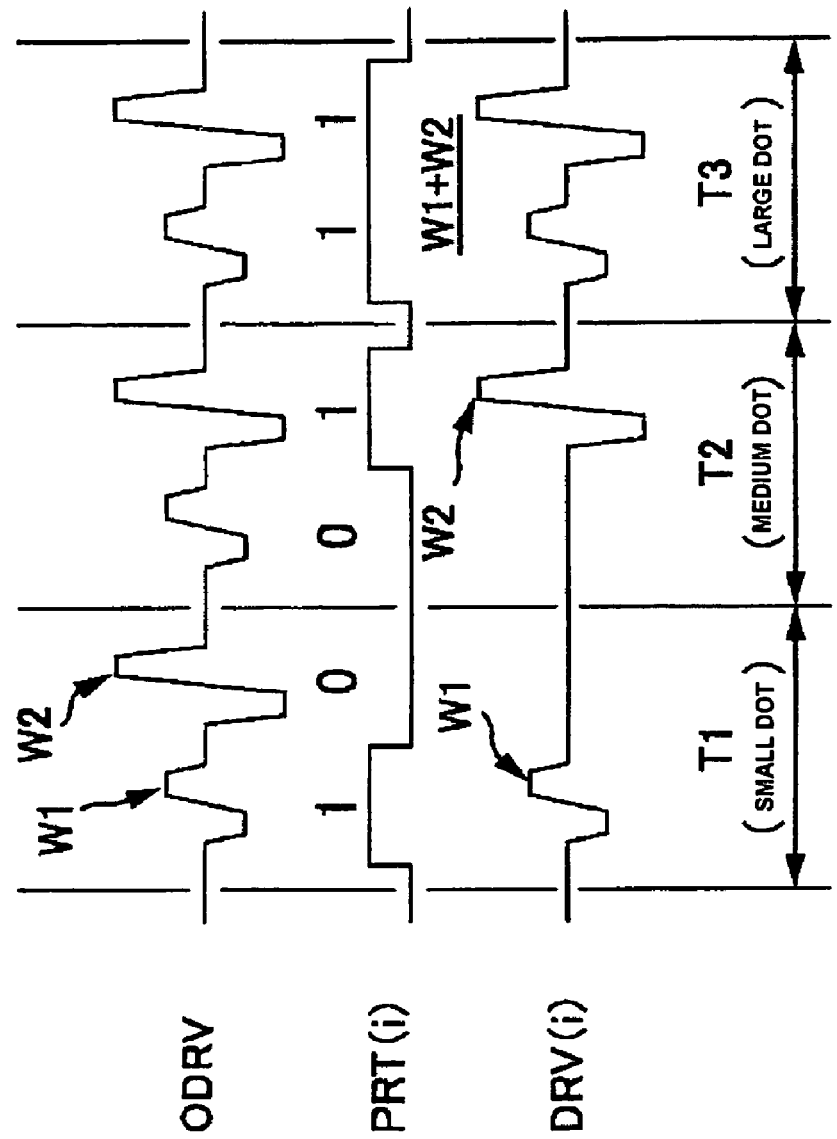
FIG. 7 is a timing chart of the signals.

The driving of the head 31 is described using FIG. 6 and FIG. 7. FIG. 6 is a block diagram showing the configuration within the head drive circuit 57. FIG. 7 is a timing chart for explaining these signals. That is, FIG. 7 shows a timing chart for an original signal ODRV, a print signal PRT(i), and a drive signal DRV(i). The number in parentheses at the end of the name of each of the signals in the diagram indicates the number of the nozzle to which that signal is supplied. It should be noted that the configuration of FIG. 6 can also be provided in a location of the controller 50 other than within the head drive circuit.

The head drive circuit 57 has an original signal generation section 572, a plurality of mask circuits 574, and a correction section 576.

The original signal generation section 572 creates an original signal ODRV that is shared by the nozzles #1 to #n. The original signal ODRV is a signal that includes two pulses, a first pulse W1 and a second pulse W2, during the main scanning period of a single pixel (during the period that the carriage crosses over a single pixel). The original signal generation section 572 outputs the original signal ODRV to the mask circuits 574.

The mask circuits 574 are provided corresponding to the plurality of piezo elements for driving each of the nozzles #1 to #n of the head 31. Each of the mask circuits 574 receives the original signal ODRV from the original signal generation section 572 and also receive the print signals PRT(i). The print signals PRT(i) are pixel data that correspond to the pixel and are binary signals having two bits of information per pixel, and are included in the CMYK raster data mentioned above. The mask circuits 574 block the original signal ODRV depending on the level of the print signals PRT(i). That is, when a print signal PRT(i) is level 1, the mask circuit 574 allows the pulses corresponding to the original signal ODRV to pass through as is, and turns the original signal ODRV into the drive signal DRV. On the other hand, when a print signal PRT(i) is level 0, then the mask circuit 574 blocks the pulses of the original signal ODRV. Then, based on the original signal ODRV and the print signal PRT(i), the mask circuit 574 outputs a drive signal DRV(i) to the correction section 576.

The correction section 576 receives the drive signals DRV(i). The correction section 576 carries out correction by shifting the timing of the waveform of the drive signals DRV(i). By correcting the timing of the waveforms of the drive signals, the timing at which ink is ejected during movement of the carriage in the forward and return passes is corrected. Thus, the positions where dots are formed on the print paper P in the forward and return passes are corrected.

Figure 8:
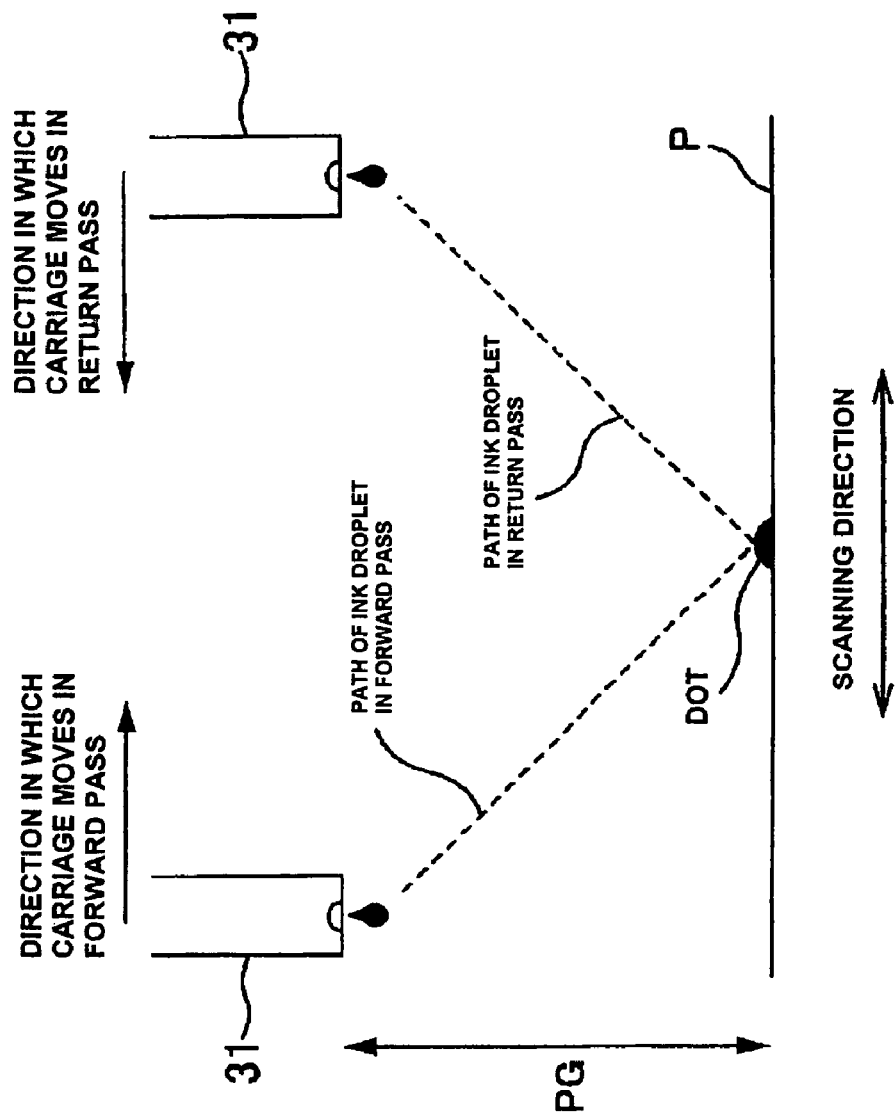
FIG. 8 is an explanatory diagram of the timing of the ejection of ink in the forward and return passes.

FIG. 8 is an explanatory diagram of the timing of the ejection of ink in the forward and return passes. This explanatory diagram is a view taken from the carrying direction, and thus the direction perpendicular to the paper plane is the carrying direction and the left to right direction of the paper plane is the scanning direction. The head 31 and the print paper P are in opposition to one another with a gap PG between them. The ink droplets Ip that are ejected from the head 31 travel only the distance of the gap PG before arriving at the print paper P. The ink droplets IP are ejected while the carriage 21 is moving, and thus are subjected to inertial force. Therefore, to form dots at a target position on the print paper P, it is necessary to eject ink from a position that is in front of the target position. Since the direction of movement is different in the forward and return passes, the timing of ejection is different even if dots are to be formed at the same target position. The correction section 576 corrects these deviations in the timing of the ejection of the ink in the forward and return passes.

The original signal ODRV generates a first pulse W1 and a second pulse W2 in that order during each pixel interval T1, T2, and T3. It should be noted that "pixel interval" has the same meaning as the period during which a single pixel is scanned.

When the print signal PRT(i) corresponds to the two bits of data "0, 1" then only the first pulse W1 is output in the first half of a single pixel interval. Accordingly, a small ink droplet is ejected from the nozzle, forming a small-sized dot (small dot) on the print paper P. When the print signal PRT(i) corresponds to the two bits of data "1,0" then only the second pulse W2 is output in the second half of a single pixel interval. Accordingly, a medium-sized ink droplet is ejected from the nozzle, forming a medium-sized dot (medium dot) on the print paper P. When the print signal PRT(i) corresponds to the two bits of data "1,1" then both the first pulse W1 and the second pulse W2 are output during a single pixel interval. Accordingly, a large ink droplet is ejected from the nozzle, forming a large-sized dot (large dot) on the print paper P. As described above, the drive signal DRV(i) in a single pixel period is shaped so that it may have three different waveforms corresponding to the three different values of the print signal PRT(i).

The print signal PRT(i), whether in the forward pass or the return pass of the main-scanning, is shaped as described above. However, although the signal waveforms are the same in the forward pass and the return pass of the main-scanning, the timing is shifted by the correction section 576 over the entire return pass, and is thereby corrected. Through correction of the timing, the spots where ink droplets land are intentionally shifted over the entire return pass so that discrepancies in where the ink droplets land in the forward pass and in the return pass are corrected.

===Printing Process===

<Regarding the Creation of Print Data>

Figure 9:
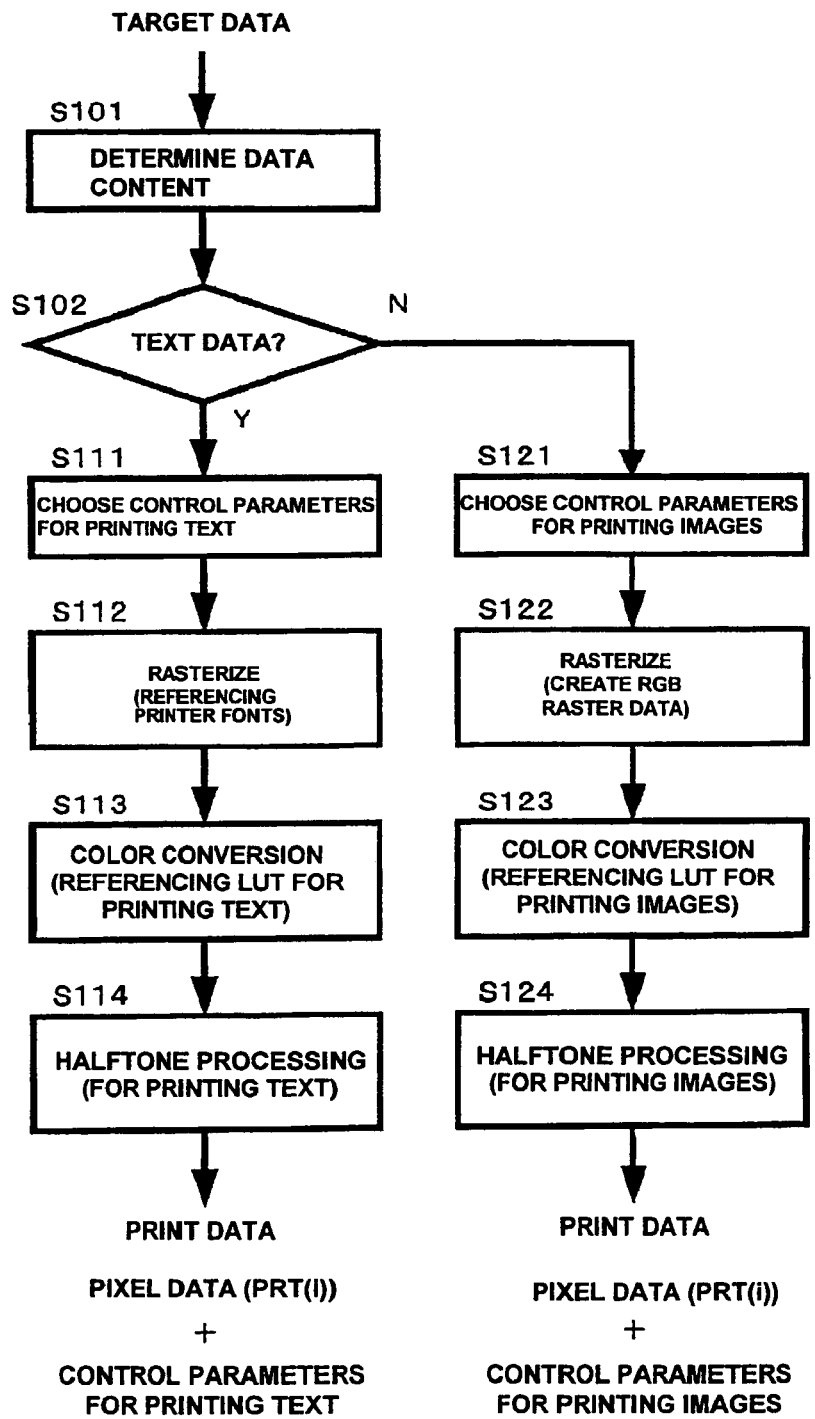
FIG. 9 is a flowchart for describing the creation of print data.

FIG. 9 is a flowchart for describing the flow up through the conversion of the data to be printed into print data. It should be noted that the following processing may also be carried out within the printer, as well as within an external device (such as within the printer driver of the computer 5).

First, data to be printed are created through an application of the external device. Since the printing operation of the printer 1 is different depending on whether text or an image is to be printed, the nature of the target data is determined so as to set print conditions that are suited for those data (S101). The method for determining the nature of the target data is discussed later. If the data are found to be text data, then the procedure advances to the flow for printing text (S111 and after), and if the data are found to be image data, then the procedure advances to the flow for printing an image (S121 and after).

If the target data are text data, then the CPU 51 references the control parameters stored in the ROM 53 and sets the control parameters for printing text (S111). Also, since character code is included in text data, the CPU 51 references the information regarding the printer fonts stored in the ROM 53 and creates RGB pixel data (or RGB raster data) of 360 dpi×360 dpi that correspond to the character code (S112). Next, based on the RGB pixel data, a lookup table (LUT) for printing text that is in the ROM 53 is referenced and the RGB pixel data are converted to CMYK pixel data (or CMYK raster data) (S113). Next, using a technique such as error diffusion, pixel data with a high resolution value (for example, 256 levels of gray) are converted to pixel data with a low resolution value (for example, binary) (S114). Then, the binary CMYK pixel data are input to the head drive circuit 57 as print data (print signals PRT(i)) and the CPU 51 controls the units in the printer based on the control parameters for printing text. As a result, using a format that is suited for printing text on the print paper P, ink droplets are ejected from the head 31 and the print paper P is carried.

If the target data are image data, then the CPU 51 references the control parameters stored in the ROM 53 and chooses the control parameters for printing images (S121). If the image data are image data in the JPEG format, then they are converted into RGB image data and then converted to 360 dpi×360 dpi RGB pixel data (or RGB raster data). Next, the lookup table (LUT) for printing images that is in the ROM 53 is referenced based on the RGB pixel data, and the RGB pixel data are converted to CMYK pixel data (or CMYK raster data) (S123). Next, using a technique such as error diffusion, pixel data with a high resolution value (for example, 256 levels in gray) are converted to pixel data with a low resolution value (for example, binary) (S124). Then, the binary CMYK pixel data are input to the head drive circuit 57 as print data (print signals PRT(i)) and the CPU 51 controls each of the units in the printer based on the control parameters for printing images. As a result, in a format that is suited for printing images onto the print paper P, ink droplets are ejected from the head 31 and the print paper P is carried.

<Regarding the Difference Between the Text Printing Operation and the Image Printing Operation>

Generally, when color conversion or halftone processing is executed with respect to image data of a natural image, a significant burden is placed on the computing means (the CPU 51 in the printer or the CPU of an external device (such as the computer 5)). For that reason, in this embodiment, the pixel data of the image data are thinned out (omitting the computations of color conversion and halftone processing for predetermined pixels) in order to ease the burden on the computing means.

On the other hand, when color conversion or halftone processing are performed with respect to text data, then thinning out the pixel data causes the edge of the characters that are printed to become blurry. For this reason, thinning is not suited for printing character data. Also, color conversion and halftone processing with respect to text data do not place a large burden on the computing means. Thus, in this embodiment, when printing text, the text data are not thinned out.

As a result, in this embodiment, the process for creating print data (including pixel data or raster data) from text data is different from the process for creating print data from image data. It should be noted that since the print data that are created in the text printing process and the image printing process are different, the operation for driving the head is different (that is, the print conditions are different).

<Regarding the Control Parameters>

The control parameters that are necessary for controlling the operation of each of the units in the printer 1 are described below.

The control parameters for the carrying unit 10 include, for example, the carry amount, the carry speed, the resolution in the carrying direction, the number of carries, the page length, and the designation of the print mode (for example, designation of unidirectional or bidirectional printing). The control parameters for the carriage unit 20 include, for example, the scan move amount, the scan move speed, the page width, and the resolution in the scanning direction. The control parameters for the head unit 30 include, for example, the number of dots in the scanning direction, the number of dots in the carrying direction, the margin (space), the number of nozzles used, the nozzle pitch (the spacing between the nozzles), the number of passes before completion of a single raster, and the designation of the print mode (for example, a designation of band printing, pseudo-band printing, interlace printing, and overlap printing).

The control parameters discussed above are used not only for controlling each of the units in the printer but are also used when creating print data (and pixel data or raster data). For example, when creating print data it is necessary to know the size of the pixel, and thus the parameters of the resolution in the scanning direction and the carrying direction become necessary.

The CPU 51 (or the controller 50) controls each of the units in the printer 1 based on the control parameters that are selected. Also, the CPU 51 (or the controller 50) creates print data based on the above control parameters and controls the ejection of ink in accordance with these print data. The control parameters are also different depending on whether text or images are to be printed. That is, the control parameters that are selected are different depending on whether text or images are to be printed, and thus the operation of each of the units is also different (that is, the print conditions are different).

===Sending and Receiving Data Wirelessly===

Figure 10:
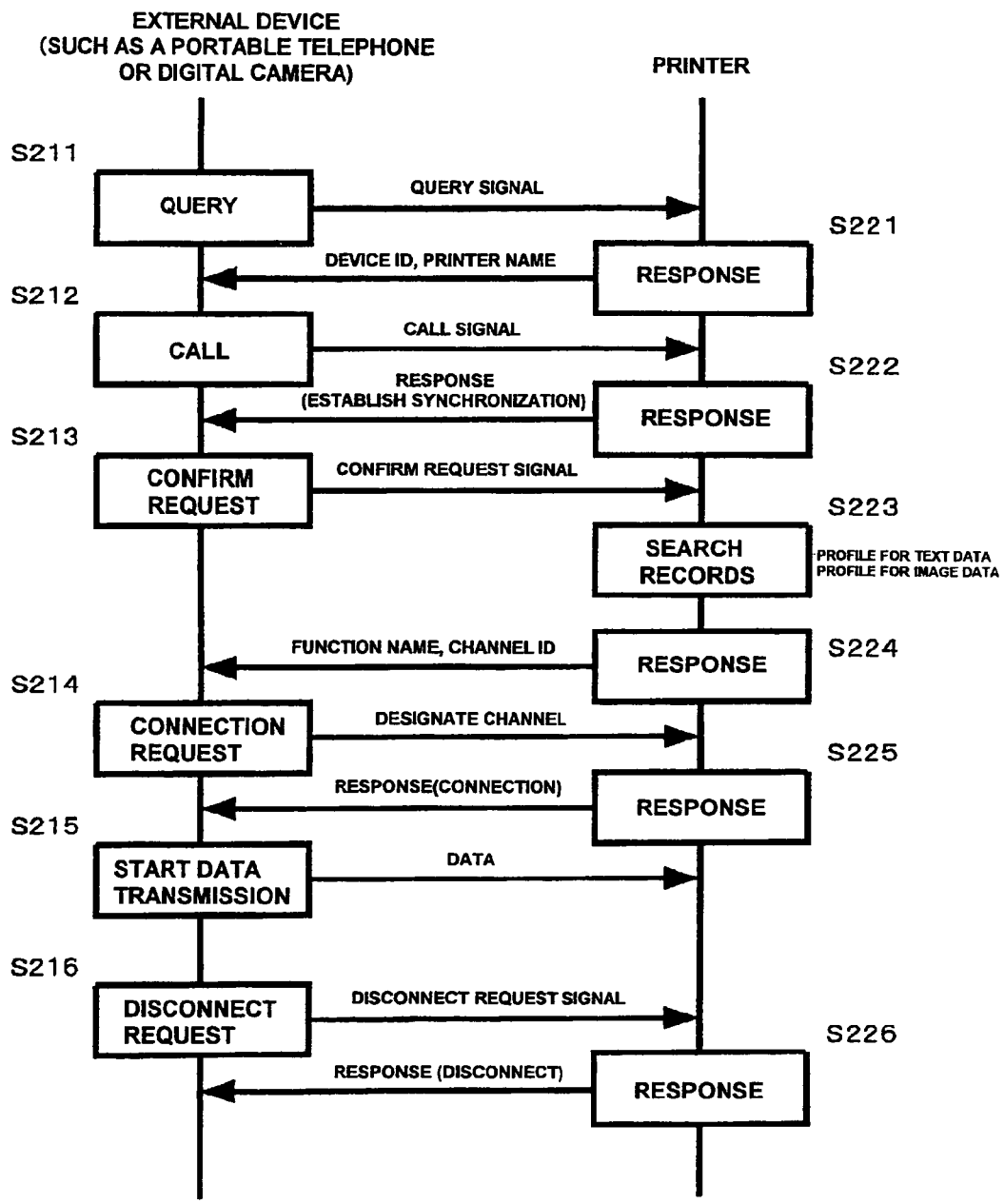
FIG. 10 is a flowchart for describing the sending and receiving of data wirelessly.

FIG. 10 is a flowchart illustrating the sending and receiving of data in the case of wireless connection according to the present embodiment. In the diagram, the external device is, for example, the portable telephone 7 or the digital camera 8. Also, in the diagram, the printer is the same as the printer described above and can transfer data between it and the external device based on two profile types, the profile for text data and the profile for image data. The operation of the printer 1 is achieved through a wireless I/F circuit (or the program stored in the ROM 53 that was mentioned above).

First, the external device makes an inquiry in order to obtain information on devices with which it can communicate (S212). The inquiry is performed by the external device continuously broadcasting inquiry signals to the surrounding area.

Next, the printer receives this inquiry signal and replies by transmitting a reply signal to the external device (S221). This reply signal includes information on the device ID or the printer name, which serves as an identifier of the printer. By the external device receiving this reply signal, it can confirm the devices with which it can communicate. It should be noted that the range that can be confirmed by the external device is normally a range with a radius of several meters around the device.

Next, the external device performs calling in order to establish synchronization with the printer (S212). In this calling, a call signal is sent by the external device to the printer. When the printer receives the call signal, it confirms the address and the clock of the external device. Then, the printer sends a reply signal in order to inform the external device that it has established synchronization (S222).

Next, the external device transmits, to the printer with which it has established synchronization, a confirm request signal for confirming the services with which the printer has been provided (S213). If the external device is the portable telephone 7, for example, then the external device sends a confirm request signal for confirming whether or not the printer supports a profile for text data. Also, if the external device is the digital camera 8, then the external device sends a confirm request signal for confirming whether or not the printer supports a profile for image data. The printer receives the confirm request signal and searches for a service record with which it is provided (S223). The service record is a lookup table for referencing functions supported by the printer, and with it, functions that are supported can be searched, using the confirm request signal as the key. In this embodiment, the printer supports a profile for text data and a profile for image data. Consequently, the printer sends a response signal indicating that it supports the function for which confirmation has been requested (S224). It should be noted that this response signal includes the names of the functions of the printer and the channel IDs, which serve as identifiers, of the logic channels corresponding to those functions. In this embodiment, CH1 has been set as the identifier of the logic channel corresponding to the text data profile, and CH2 has been set as the identifier of the logic channel corresponding to the image data profile.

Next, the external device sends, to the printer, a connection request signal for connecting to the printer (S214). The connection request signal includes information on the identifier of the target logic channel in order to designate the logic channel to be used for data transfer. If the external device is the portable telephone 7, for example, then the external device sends a connection request signal designating CH1 in order for data transfer to be carried out using the profile for text data. If the external device is the digital camera 8, for example, then the external device sends a connection request signal designating CH2 in order to carry out data transfer using the profile for image data. When the printer receives this connection request signal, it sends a signal indicating that connection has been completed to the external device (S225).

Then, the external device sends, to the printer, the data that are to be printed to the print paper (S215). If the external device is the portable telephone 7, for example, then in accordance with the profile for text data, text data are sent from the external device to the printer using the logic channel CH1. Consequently, in this case, the printer uses the logic channel CH1 to receive the text data. If the external device is the digital camera 8, for example, then in accordance with the profile for image data, image data are sent from the external device to the printer using the logic channel CH2. Consequently, in this case, the printer uses the logic channel CH2 to receive the image data.

It should be noted that when the external device has finished sending data to the printer, it sends a disconnect request signal to the printer in order to end the connection (S216). When the printer receives a disconnect request signal, it sends a response signal to the external device (S226). Once the external device has received this response signal, which means that disconnection is complete, then the state of connection between the printer and the external device is switched to the disconnected state.

In this embodiment, as described above, when text data are transmitted in accordance with the profile for text data, then the data to be printed (text data) are transferred from the external device (the portable telephone 7, for example) to the printer using the logic channel CH1. On the other hand, when image data are transmitted in accordance with the profile for image data, then the data to be printed (image data) are transferred from the external device (the digital camera 8, for example) to the printer using the logic channel CH2. That is, if the data transfer route is CH1, then the printer side recognizes that transfer is carried out in accordance with the profile for text data, whereas if the data transfer route is CH2, then the printer side recognizes that transfer is carried out in accordance with the profile for image data.

===Method of Determining the Data Content According to the Present Embodiment===

Figure 11:
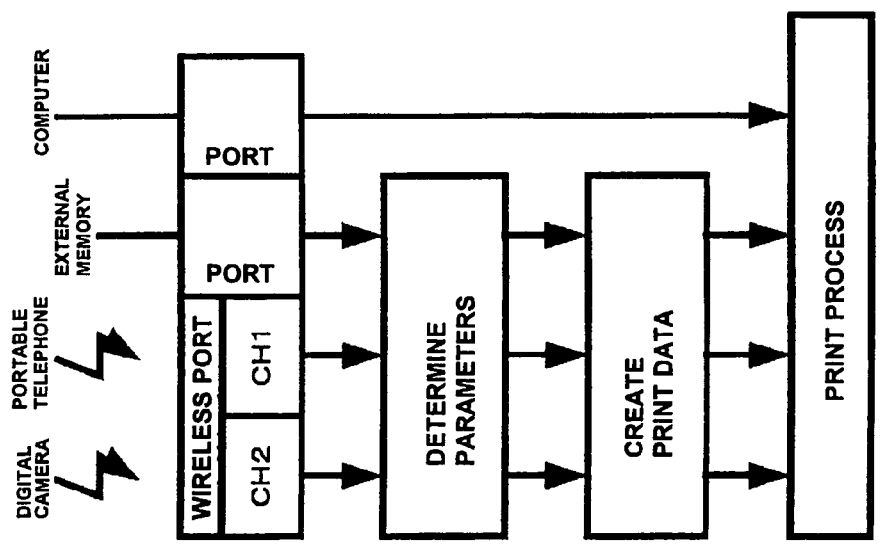
FIG. 11 is a flowchart for describing the printing process for each reception means (reception unit).

FIG. 11 is a flowchart for explaining the printing process for each reception means (reception unit) for receiving data. The diagram shows the manner in which the data that are received are processed after being stored in the RAM 52 via the various ports.

Data that are stored in the RAM 52 via the port 62 from the computer 5, which is an external device, are print data that already include pixel data (raster data) due to the printer driver of the computer 5. These print data also include control parameters for setting the operations of each of the units in the printer 1. For this reason, the CPU 51 sets the operations of each of the units in the printer 1 based on the data received through the port 62, and carries out the printing operation.

Data that are stored in the RAM 52 via the port 64 from the external memory 6 are primarily image data that have been captured by a digital camera. Consequently, the CPU 51 (or the controller 50), with respect to the data that are received from the port 64, chooses the control parameters for printing images and creates print data based on those control parameters. Then the CPU 51 carries out the printing process controlling the various units in the printer 1 based on the control parameters for printing images. It should be noted that if the data that are received from the port 64 include control parameters, then it is also possible to use those parameters to create print data or to carry out printing.

The data that are stored in the RAM 52 via the wireless port 66 may be text data or image data, as was discussed above. To determine the print format according to the contents of the data, the printer 1 must determine whether the data that are received from the wireless port 66 are text data or image data. In this embodiment, the nature of the data that are received (whether they are text data or image data) is determined by the printer 1 (or the controller 50) determining which logic channel (CH1, CH2) the data were received from. That is, if the data transfer route is CH1, then transfer is carried out in accordance with the profile for text data, and thus the printer 1 (or the controller 50) can determine that the data that are received are text data. On the other hand, if the data transfer route is CH2, then transfer is carried out in accordance with the profile for image data, and thus the printer 1 (or the controller 50) can determine that the data that are received are image data.

It should be noted that the logic channel from which data are received is determined based on the information regarding the identifier of the logic channel that is included in the connection request signal (see S214 of FIG. 10) received from the external device. Also, a lookup table that correlates the identifiers of the logic channels and the control parameters is stored in advance in the ROM 53 of the printer 1. When the printer 1 receives a connection request signal from the external device, the printer can search the lookup table using the identifier for the logic channel that is included in that connection request signal and read out the corresponding control parameters. In this embodiment, the lookup table correlates the logic channel CH1 with the control parameters for printing text and correlates the logic channel CH2 with the control parameters for printing images.

As discussed above, data that are stored in the RAM 52 via the logic channel CH1 are regarded as text data. Accordingly, the CPU 51 (or the controller 50) reads the control parameters for the various types of printing that are on the ROM 53 and chooses the control parameters for printing text. Then, the CPU 51 reads out the character codes in the data that are received through CH1 and searches for printer fonts on the ROM 53 that correspond to the character codes, and then creates raster data corresponding to the character codes in the text data. The CPU 51 creates print data based on the control parameters for printing text that have been chosen and the raster data. Then, the CPU 51 controls each of the units in the printer 1 based on the control parameters for printing text and prints the print paper in accordance with the print data.

Also, as discussed above, the data that are stored in the RAM 52 via the logic channel CH2 are regarded as image data. Accordingly, the CPU 51 (or the controller 50) reads the control parameters for the various types of printing that are on the ROM 53 and chooses the control parameters for printing images. Then, the CPU 51 converts the data that are received through CH2 (data of the JPEG format) to RGB data, creating raster data. The CPU 51 creates print data based on the control parameters for printing images that have been chosen and the raster data. Print data are created. Then, the CPU 51 controls each of the units in the printer 1 based on the control parameters for printing images and prints the print paper P in accordance with the print data. It should be noted that if the data that are received from the CH2 are not data of the JPEG format and are instead RGB data, then it is of course not necessary to convert JPEG format data into RGB data.

The printer of this embodiment selects the control parameters for printing (control parameters for printing text or control parameters for printing images) according to the data that are received (text data or image data). Also, the printer of this embodiment creates print data (including pixel data or raster data) according to the data that are received. That is, with the printer of this embodiment, the various units (the carrying unit 10, the carriage unit 20, and the head unit 30, for example) for carrying out printing are controlled in accordance with the parameters (control parameters and print data) that are suited for the data to be printed. Thus, according to this embodiment, the print conditions are set according to the data that are received, and thus it is possible to print high-quality images onto the print paper P.

Also, the printer of this embodiment does not determine the nature of the data that are received but rather selects the control parameters in accordance with the reception means (ports and logic channels serving as reception units) that receive the data. Since the computing ability of the CPU 51 is inferior to the computing ability of the external computer, if the CPU 51 were to determine the data type (text data or image data) based on the nature of the data that are received, then this would in turn increase the amount of time before printing is started. That is, with the printer of this embodiment, the control parameters are selected according to the reception means (reception unit), and thus the printing operation can be made faster.

Also, the printer of this embodiment chooses the control parameters according to the port through which data are received. Thus, each of the units in the printer 1 can be controlled in accordance with the ports, which serve as hardware, without determining the contents of the data that are received.

Also, the printer of this embodiment chooses the control parameters in accordance with the logic channel through which data are received. Thus, each of the units in the printer 1 can be controlled in accordance with the logical reception means. That is, in this embodiment, even if different types of data are received through the same port (wireless port), the reception means are regarded as distinct if the logical reception means is different, and the control parameters that correspond to that reception means (the control parameters that correspond to the data (text data or image data) that are received) are chosen.

===Configuration of the Computer System, etc.===

Next, an embodiment of a computer system, a computer program, and a storage medium storing the computer program are described with reference to the drawings.

Figure 12:
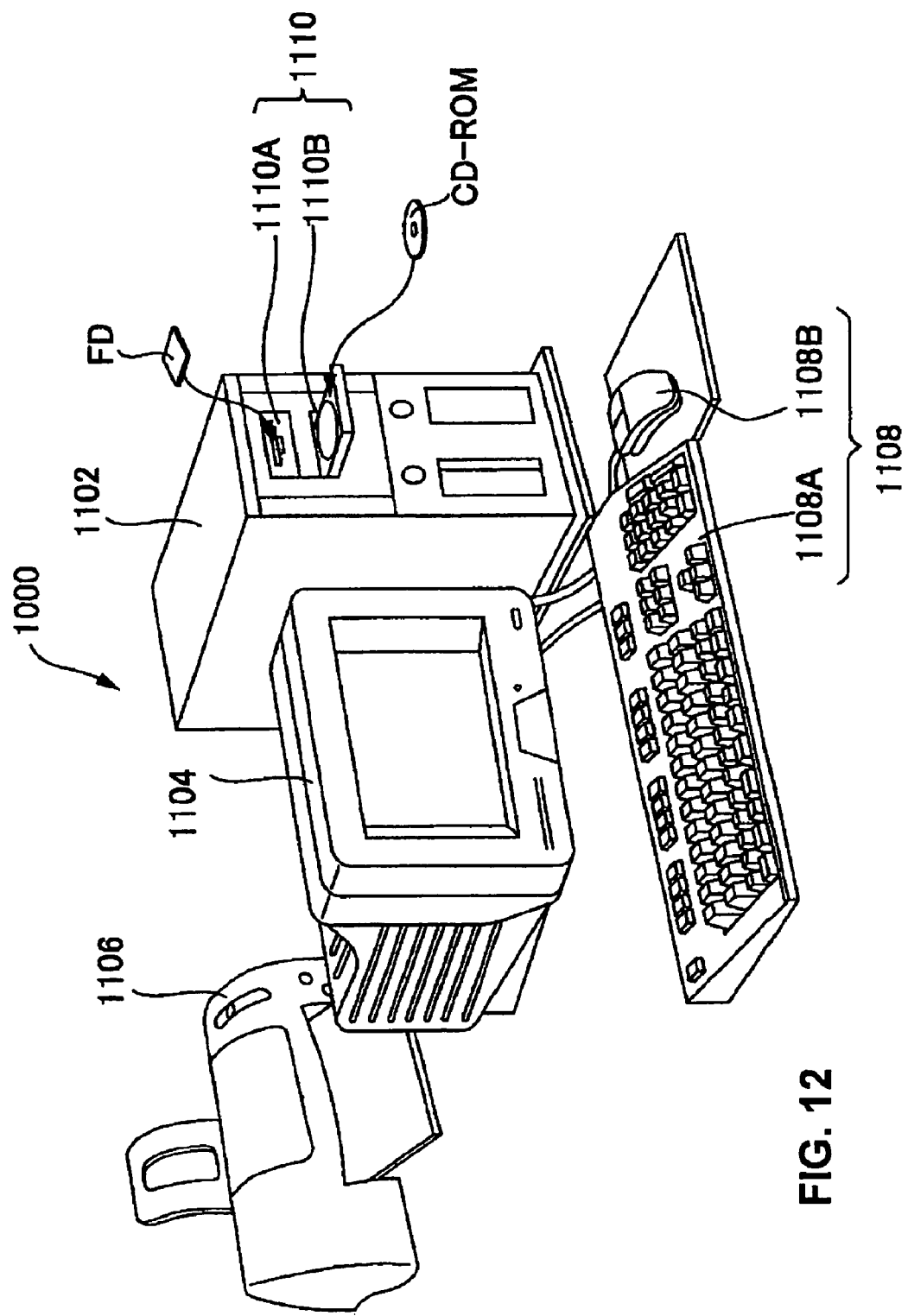
FIG. 12 is a diagram showing the external configuration of the computer system.

FIG. 12 is an explanatory drawing showing the external structure of the computer system. A computer system 1000 is provided with a main computer unit 1102, a display device 1104, a printer 1106, an input device 1108, and a reading device 1110. In this embodiment, the main computer unit 1102 is accommodated within a mini-tower type housing; however, this is not a limitation. A CRT (cathode ray tube), plasma display, or liquid crystal display device, for example, is generally used as the display device 1104, but this is not a limitation. The printer 1106 is the printer described above. In this embodiment, the input device 1108 is a keyboard 1108A and a mouse 1108B, but it is not limited to these. In this embodiment, a flexible disk drive device 1110A and a CD-ROM drive device 1110B are used as the reading device 1110, but the reading device 1110 is not limited to these, and it may also be an MO (magnet optical) disk drive device or a DVD (digital versatile disk), for example.

Figure 13:
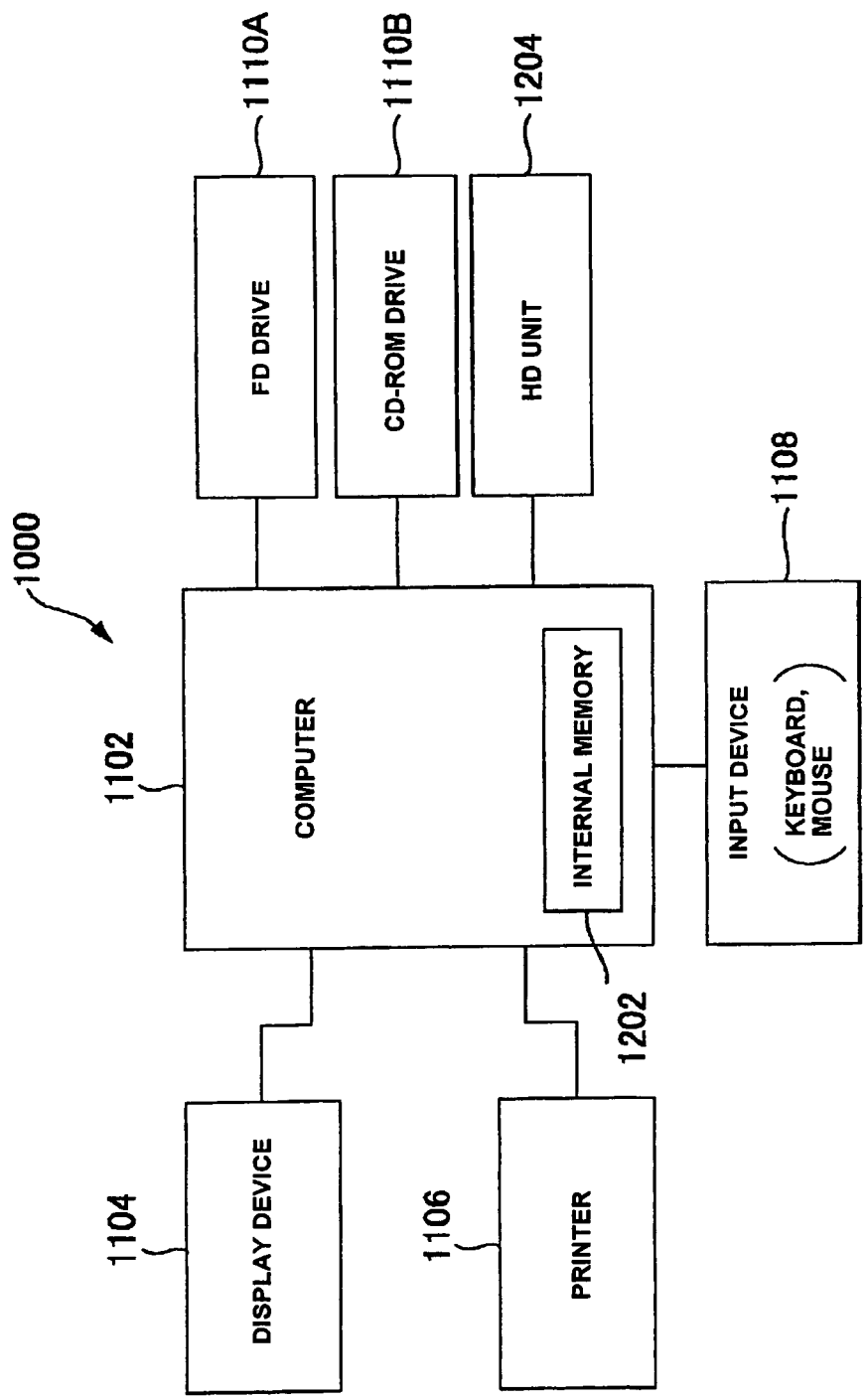
FIG. 13 is a block diagram showing the configuration of the computer system.

FIG. 13 is a block diagram showing the configuration of the computer system shown in FIG. 12. An internal memory 1202 such as a RAM within the housing accommodating the main computer unit 1102 and, also, an external memory such as a hard disk drive unit 1204 are provided.

A computer program for controlling the operation of the above printer can be downloaded onto the computer system 1000, for example, connected to the printer 1106 via a communications line such as the Internet, and it can also be stored on a computer-readable storage medium and distributed, for example. Various types of storage media can be used as this storage medium, including flexible disks FDs, CD-ROMs, DVD-ROMs, magnet optical disks MOs, hard disks, and memories. It should be noted that information stored on such storage media can be read by various types of reading devices 1110.

Figure 14:
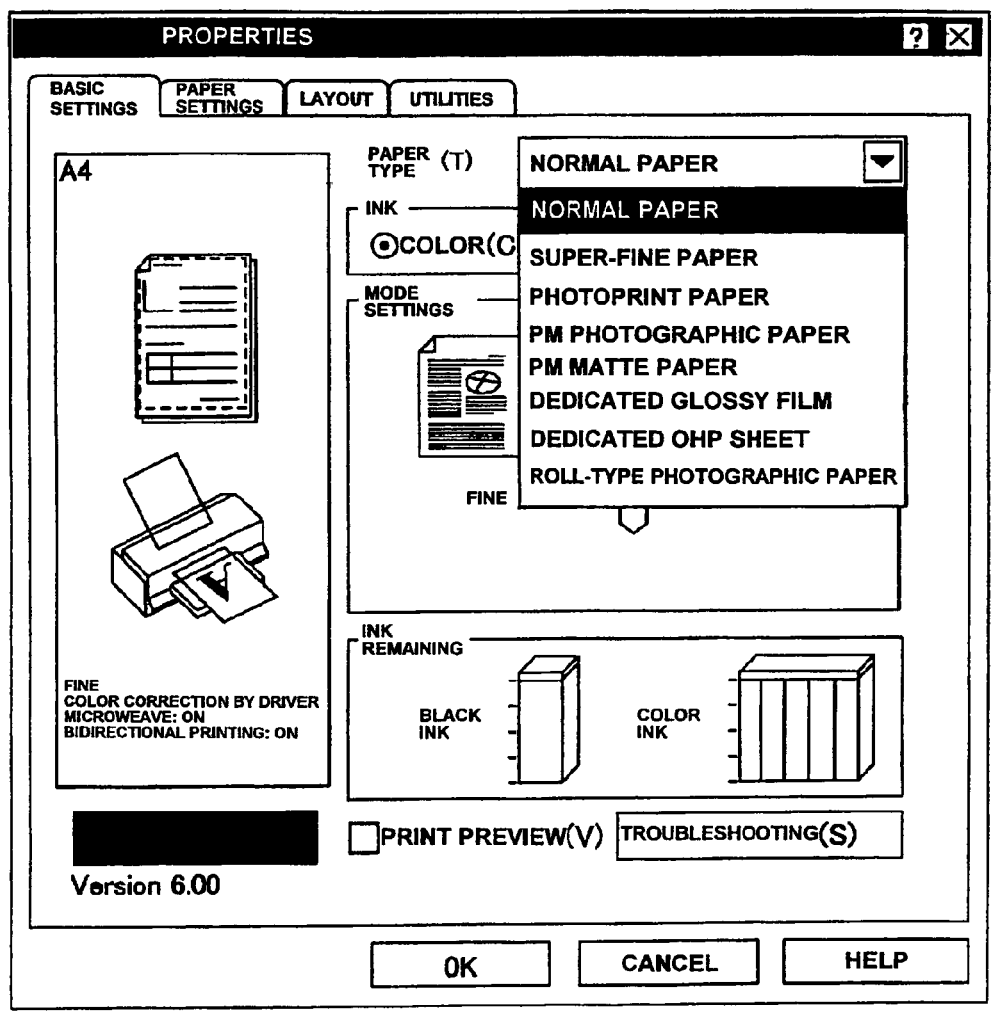
FIG. 14 is an explanatory diagram of the user interface of the printer driver.

FIG. 14 is an explanatory diagram showing the user interface of a printer driver displayed on the screen of the display device 1104 connected to the computer system. The user can use the input device 1108 to change the various settings of the printer driver. By changing the various settings of the printer driver, the print conditions when the printer carries out printing are set.

The user can select the print mode from this screen. For example, the user can select as the print mode a quick print mode or a fine print mode. From this screen the user can also select the dot spacing (resolution) when printing. For example, from this screen the user can select 720 dpi or 360 dpi as the print resolution.

Figure 15:
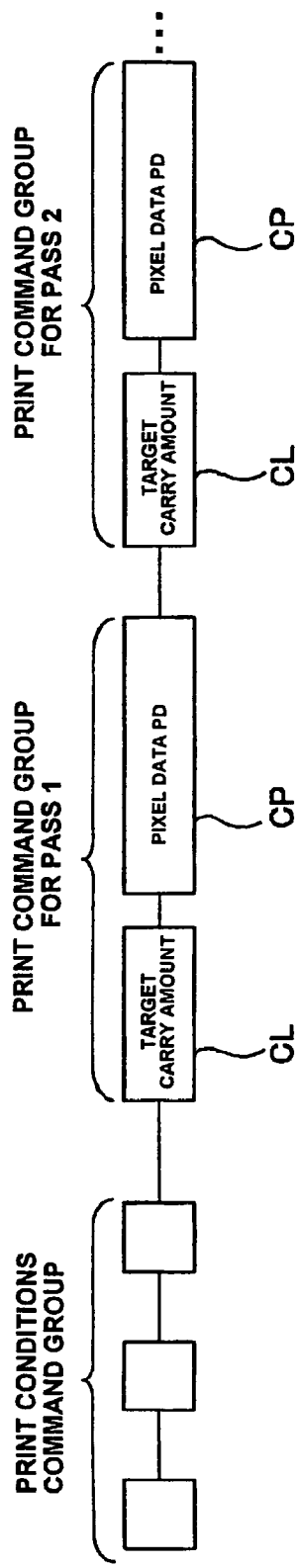
FIG. 15 is an explanatory diagram of the format of the print data.

FIG. 15 is an explanatory diagram of the format of the print data supplied from the main computer unit 1102 to the printer 1106. The print data are created from image information based on the settings of the printer driver. The print data have a print condition command group and pass command groups. The print condition command group is a command signal group for designating the control parameters selected by the printer. The print condition command group includes a command for indicating the print resolution and a command for indicating the print direction (unidirectional/bidirectional), for example. The print command groups for each pass include a target carry amount command CL and a pixel data command CP. The pixel data command CP includes pixel data PD indicating the recording status for each pixel of the dots recorded in that pass. It should be noted that the various commands shown in the diagram each have a header section and a data section; however, here they are shown simplified. Also, these command groups are supplied intermittently to the printer side from the main computer unit side for each command. The print data are not limited to this format, however.

It should be noted that in the above description, an example was described in which the computer system is constituted by connecting the printer 1106 to the main computer unit 1102, the display device 1104, the input device 1108, and the reading device 1110; however, this is not a limitation. For example, the computer system can be made of the main computer unit 1102 and the printer 1106, or the computer system does not have to be provided with any one of the display device 1104, the input device 1108, and the reading device 1110. It is also possible for the printer 1106 to have some of the functions or mechanisms of the main computer unit 1102, the display device 1104, the input device 1108, and the reading device 1110. As an example, the printer 1106 may be configured so as to have an image processing section for carrying out image processing, a display section for carrying out various types of displays, and a recording media attachment/detachment section to and from which recording media recording image data captured by a digital camera or the like are inserted and taken out.

As an overall system, the computer system that is thus achieved is superior to the conventional systems.

===Other Embodiments===

The foregoing embodiment described primarily a printer. However, it goes without saying that the foregoing description also includes the disclosure of determination methods, printing apparatuses, printing methods, programs, storage media, computer systems, display screens, screen display methods, methods for manufacturing printed material, recording apparatuses, and devices for ejecting liquids, for example.

Also, a printer, for example, serving as an embodiment was described above. However, the foregoing embodiment is for the purpose of elucidating the present invention and is not to be interpreted as limiting the present invention. The invention can of course be altered and improved without departing from the gist thereof and includes functional equivalents. In particular, the embodiments mentioned below are also included in the invention.

<Regarding the Method of Determining Data Content>

In the embodiment described above, when determining whether received data are text data or image data, all of the data that were received are evaluated according to the reception means (port or logic channel). However, there is no limitation to this method.

For example, if creating target data with an application on the computer and determining the content of the target data on the computer, then, since the contents of the target data is already known on the computer, it is also possible to perform determination in correspondence with this information.

Also, for example, if the header section of the data that are received from the outside includes attribute information (information on the nature of the data that is used when setting the print conditions), then determination is performed according to the header section of the received data. That is, if the data that are received from the outside do not include attribute information, then the determination method described above can be executed. It should be noted that if data are transferred wirelessly, then attribute information is often not included in the data so that the connection compatibility between different device types is maintained.

<Regarding the External Device>

In the embodiment described above, external devices that are connected wirelessly (such as portable telephones and digital cameras) sent only either text data or image data to the printer. However, this is not a limitation.

For example, an external device that is connected wirelessly (such as a PDA) may also be capable of transmitting both text data and image data. In this case, the external device confirms whether or not the printer supports both the profile for text data and the profile for image data, and establishes two channels. Then, when the external device sends text data, it uses CH1 to send the data using the profile for text data. When the same external device sends image data, it uses CH2 to send the data via the profile for image data.

<Regarding Selection of the Control Parameters>

In the embodiment described above, all of the control parameters (information regarding the print conditions) were selected by the external device (such as the computer) or the printer. Selection of the control parameters, however, is not limited to this.

For example, if control parameters are included in the data received from the external device, then it is also possible to use those control parameters. In particular, it is also possible for the external device to select some of the control parameters and, in order to supplement the remaining parameters, for the printer to select control parameters. It is preferable that selection of control parameters by the printer in this case is carried out in accordance with the data reception means.

<Regarding Wireless Data Transfer>

In the embodiment described above, the data that were received wirelessly did not include attribute information in their header section. However, this is not a limitation. For example, it is also possible to include in the header section, for example, information designating the size of the print target (the size of the print paper), information designating the number of sheets to be printed, and information designating the number of images to be printed on one page, even when data are transferred wirelessly, for example.

<Regarding the Recording Apparatus>

In the embodiment described above, a printer was described as the recording apparatus. This is not a limitation, however. For example, technology like that of the present embodiment can also be adopted for various types of recording apparatuses that use inkjet technology, including color filter manufacturing devices, dyeing devices, fine processing devices, semiconductor manufacturing devices, surface processing devices, three-dimensional shape forming machines, liquid vaporizing devices, organic EL manufacturing devices (particularly macromolecular EL manufacturing devices), display manufacturing devices, film formation devices, and DNA chip manufacturing devices. Also, these methods and manufacturing methods are within the scope of application. Even when the present technology is adopted in these fields, the fact that liquid can be directly ejected (written) to a target object allows a reduction in material, process steps, and costs compared to conventional cases.

<Regarding the Ink>

Since the foregoing embodiment was an embodiment of a printer, a dye ink or a pigment ink was ejected from the nozzles. However, the liquid that is ejected from the nozzles is not limited to such inks. For example, it is also possible to eject from the nozzles a liquid (including water) including, for example, metallic material, organic material (particularly polymeric material), magnetic material, conductive material, wiring material, film-formation material, electronic ink, machining liquid, or genetic solutions. A reduction in material, process steps, and costs can be achieved if such liquids are directly ejected toward a target object.

<Regarding the Nozzles>

In the foregoing embodiment, ink was ejected using piezoelectric elements. However, the method for ejecting liquid is not limited to this. Other methods, such as a method for generating bubbles in the nozzles through heat, may also be employed.

As set forth above, it is possible to achieve high-quality and high-speed printing with the printing method and the printing apparatus according to the present embodiment.

=Second Embodiment=

Hereinafter, a second embodiment in which the printing method and the printing apparatus (hereinafter, also referred to as "reproduction and output apparatus") of the present invention are achieved by a printer are described using FIG. 16 to FIG. 19.

Figure 16:
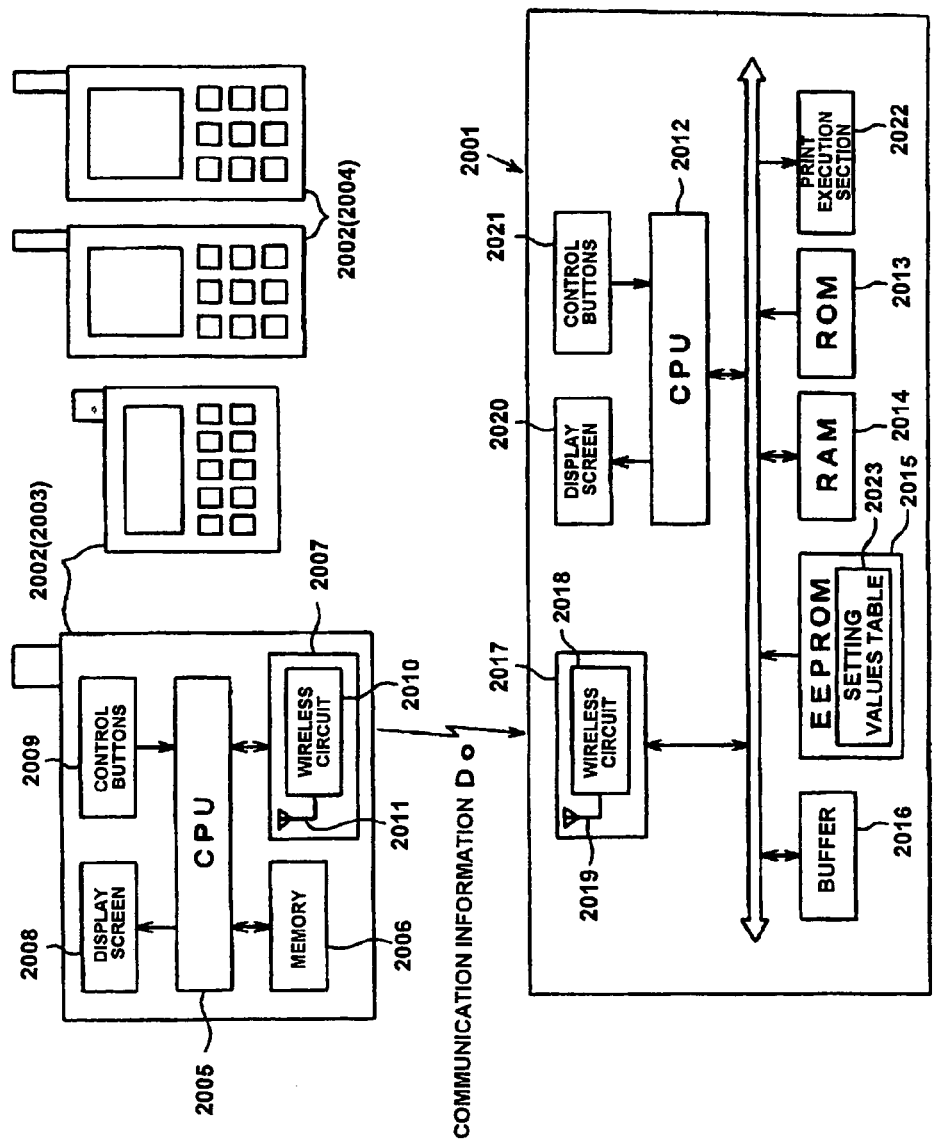
FIG. 16 is a diagram schematically showing the configuration of the printer in the second embodiment.

FIG. 16 is a diagram that schematically shows a printer 2001 and mobile devices 2002. The printer 2001 serves as the reproduction and output apparatus (printing apparatus) and is capable of exchanging communication information $D_0$ with the plurality of mobile devices 2002 via wireless communication. The mobile device 2002 is, for example, a PDA (Personal Digital Assistance) 2003 or a portable telephone 2004. Also, Bluetooth (R) is used as the wireless communication method. The printer 2001 and the mobile device 2002 are capable of bidirectional communication.

The mobile device 2002 is provided with a CPU 2005, a memory 2006, a communications interface 2007, a display screen 2008, and control buttons 2009. The communications interface 2007 includes a chip for Bluetooth that is internally provided with a wireless circuit 2010 and an antenna 2011, and wirelessly sends and receives signals to and from the printer 2001. Also, the communications interface 2007, in correspondence with operation of the control buttons 2009, sends the communication information $D_0$ to the outside based on a command from the CPU 2005. Here, the communication information $D_0$ of this example is made of device identification information $D_a$ and print information (print job data) $D_b$.

The device identification information $D_a$ is made of various identifiers ID, such as the protocol, the profile, the model name, and the fixed address. The protocol defines the communications method for wireless communication, and the profile is for determining how to use the protocol. The model name expresses the model name of the mobile device 2002, and has been determined for each model (product type) of the PDA 2003 and the portable telephone 2004. The fixed address is the address of each mobile device 2002. The address, model name, profile, and protocol are organized in a hierarchy, and the order of the hierarchy is the above order in order from the lower side.

Also, the profile, the model name, and the address are transmitted included in the header section of the print information $D_b$. The mobile device 2002 can send the print information $D_b$ divided into units (packets) for the purpose of data transmission or can send all the print information as one data unit without dividing it. Moreover, the print information $D_b$ can be image data or character data. If it is image data, then each picture is sent as a single job data, and if it is character data, then a single file is sent as a single job data.

The printer 2001 is provided with a CPU 2012, a ROM 2013, a RAM 2014, an EEPROM 2015, a buffer 2016, and a communications interface (reception section) 2017. The communications interface 2017 includes a chip for Bluetooth that is internally provided with a wireless circuit 2018 and an antenna 2019, and wirelessly exchanges signals with the mobile device 2002. The wireless circuit 2018 takes in and demodulates the device identification information $D_a$ and the print information $D_b$ from the outside via the antenna 2019, and wirelessly transmits signals to the outside via the antenna 2019 in accordance with commands from the CPU 2012. It should be noted that the CPU 2012 can also function as a print conditions setting section for setting print conditions for the print data that are obtained through the reception section, and as discussed later, the CPU 2012 sets the print conditions in accordance with the content of pre-communication through the reception section.

The printer 2001 is provided with a display screen 2020, control buttons 2021, and a print execution section 2022. When the CPU 2012 receives the print information $D_b$ from the mobile device 2002 wirelessly, it holds that information in the buffer 2016. At this time, while the CPU 2012 is taking in the print information $D_b$, it displays "Receiving data from mobile device" on the display screen 2020 as a display item based on the mobile identification information $D_a$. As a result, the user can know from what mobile device 2002 the print information is currently being received.

The printer execution section 2022 is, for example, constituted by an ASIC, and this ASIC is for driving and controlling the recording head, the carriage motor, the carriage, the paper feed motor, the paper feed roller, and the paper supply roller, for example, making up the mechanical mechanism. The print execution section 2022 subjects the print information $D_b$ stored in the buffer 2016 to RGB color conversion and rasterization, for example, and operates the mechanical mechanism based on these raster data so as to perform printing by ejecting ink onto a paper (recording medium).

A control program for setting the print conditions when printing the print information $D_b$ received from the mobile device 2002 is stored on the ROM 2013. Also, a setting values table 2023, which is shown in FIG. 17, is stored in the EEPROM 2015. The CPU 2012 references the setting values table 2023 based on the control program of the ROM 2013 and then executes a print conditions setting process for setting the print conditions of the printer 2001. The print conditions setting process of this example is a process for setting the print conditions for each mobile device 2002 (communication information).

FIG. 17 is a table showing the setting values table 2023. The setting values table 2023 can be displayed on the display screen 2020 of the printer 2001 by operation of the control buttons 2021, allowing the user to freely carry out settings using the control buttons 2021 as he/she looks at the display screen 2020. An identifier column 2024 showing the identifiers ID is provided in the setting values table 2023, and the column 2024 is divided by identifier type into an identifier ID1 for the address, an identifier ID2 for the model name, an identifier ID3 for the profile, and an identifier ID4 for the protocol.

Also, a plurality of address names a1, . . . are set in the address identifier ID1 division, a plurality of model names . . . , a2, . . . are set in the model name identifier ID2 division, a plurality of profiles . . . , a3, . . . are set in the profile identifier ID3 division, and a plurality of protocols . . . , a4, . . . are set in the protocol identifier ID4 division. Also, for each identifier a1, . . . , print conditions are set.

For example, when setting device-specific print conditions for the mobile device 2002, the address of that device is registered in the address identifier ID1 division and then the print conditions are input. When setting the model specific print conditions for that model name, the model name is registered in the model name identifier ID2 division and then the print conditions are input. The profile and the protocol are processed similarly and the task of inputting is carried out.

Also, columns 2025 to 2031 for print mode, paper type, picture quality, paper size, layout, detailed settings, and validity are provided in the setting values table 2023. To the print mode column 2025 is input a printing method such as single frame printing, all frames printing, and list printing, and to the paper type column 2026 is input a paper to be printed. To the picture quality column 2027 is input whether to give priority to high speed or high quality, to the paper size column 2028 is input the size of the paper to be printed, and to the layout column 2029 is input the print layout.

To the detailed settings column 2030 are input detailed settings for printing. Examples of the detailed settings include scene correction, brightness adjustment, vividness adjustment, sharpness, and automatic correction. Of these, automatic correction includes an image harmonizing function and an image correcting function. The image harmonizing function is a function for processing images based on image information included in the print information so that a high-quality image is obtained, and the image correcting function is a function for performing correction if the contrast, color, or color balance are not appropriate.

The detailed settings column 2030 also includes information on the existence of zooming, frames, cut roll paper, date, time printing, trimming, bidirectional printing, and cutting guides, for example. To the validity column 2031 is input either valid or invalid. For entries to which valid has been input, the entry becomes a target when setting print conditions, and for entries to which invalid has been input, the entry is excluded when setting the print conditions. The settings for the values that are input to the setting values table 2023 can be freely changed.

Figure 18:
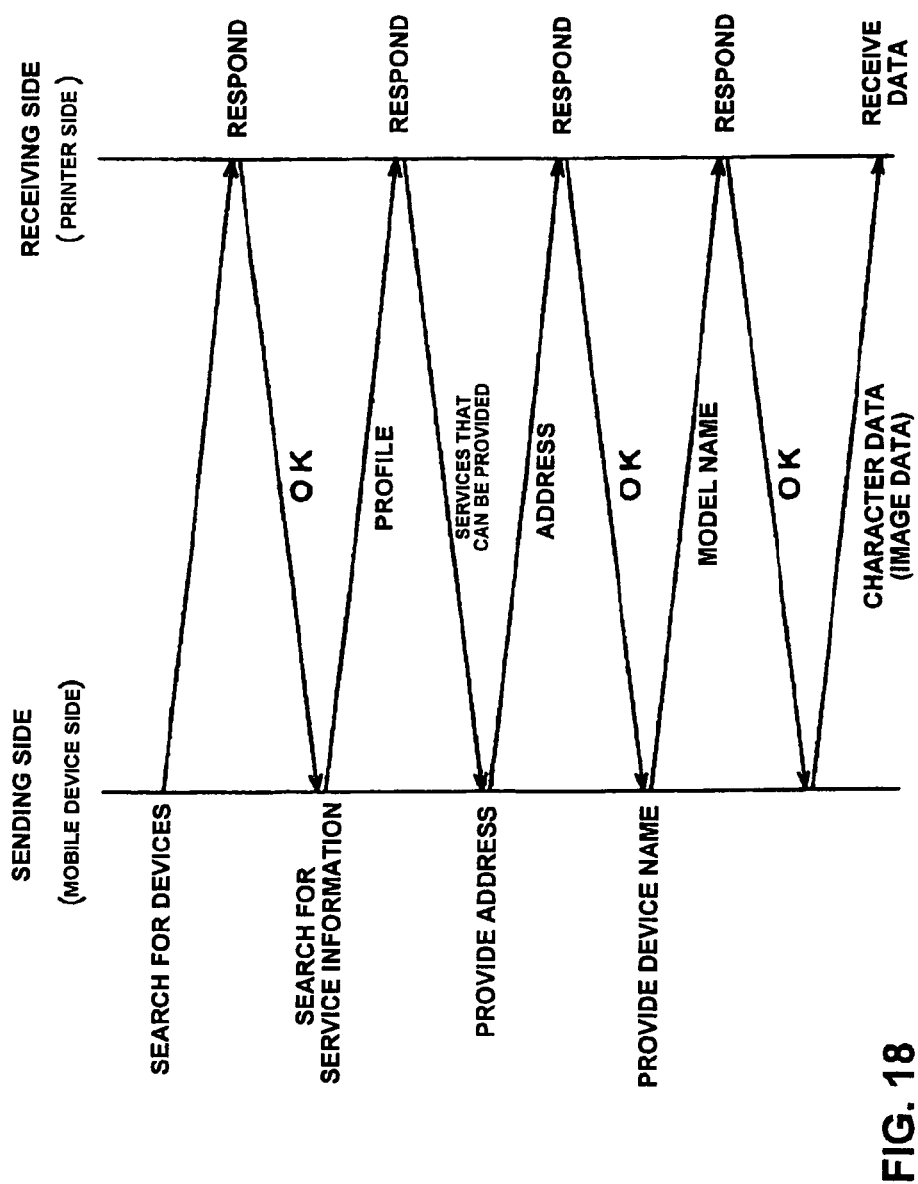
FIG. 18 is a transaction chart of the processes that are executed when setting the print conditions.

FIG. 18 is a transaction chart of when the print information $D_b$ is sent by the mobile device 2002 to the printer 2001. First, when a connection is established between the printer 2001 and the mobile device 2002, the communications protocol is determined, and the CPU 2012 accepts the protocol at that point. Then, the mobile device 2002 performs a search of communications devices, and when the printer 2001 responds to this search, it notifies the mobile device 2002 that it has received the response. Next, the mobile device 2002 performs a search for service content and sends a profile to the printer 2001. The CPU 2012 receives this profile and returns to the mobile device 2002 the services that can be provided.

Then, the mobile device 2002 sends its address to the printer 2001. The CPU 2012 receives the address and notifies the mobile device 2002 that it has received the address. After address notification, the mobile device 2002 sends its model name to the printer 2001. The CPU 2012 receives the model name and notifies the mobile device 2002 that it has received the model name. The mobile device 2002 then sends device identification information $D_a$ to the printer 2001, and then sends in sequence the character data (image data) to the printer 2001.

When the CPU 2012 receives the device identification information $D_a$ and the print information $D_b$, it sets the print conditions referencing the setting values table 2023. As described in greater detail below, the address, model name, profile, protocol making up the device identification information $D_a$ are organized in a hierarchy and the priority is also determined in the order. Thus, if there is an address identifier ID in the device identification information $D_a$, then the various conditions (print mode, paper type, picture quality, paper size, layout, detailed settings) that are determined from that address are set as the print conditions, and if there is no identifier ID at the top of the hierarchy, then the print conditions are selected in the priority order.

Here, since the address identifier ID is included in the device identification information $D_a$ of this example, when the CPU 2012 receives the device identification information $D_a$ it determines whether or not the address identifier ID included in the device identification information $D_a$ is in the identifier column 2024 of the setting values table 2023. Then, if there is an address that has a match to the identifier column 2024, then the CPU 2012 sets the various conditions that are set in that address as the print conditions. At this time, identifiers that are invalid in the validity column 2031 are ignored.

On the other hand, suppose a case where the address is not included and the model name identifier ID is included in the device identification information $D_a$. At this time, the CPU 2012 determines whether the model name identifier is in the identifier column 2024 of the setting values table 2023, and if there is a matching model name, then the CPU 2012 sets the various conditions that are set for that model name as the print conditions. Similarly, when neither the address or the model name identifiers are included in the device identification information $D_a$, the various conditions that are determined by the profile are set as the print conditions, and if there is no address, model name, or profile identifier, then the various conditions that are determined from the protocol are set as the print conditions. Moreover, if there are no print conditions settings in the protocol either, then printing is carried out using the print conditions that are currently displayed on the user interface (UI).

Figure 19:
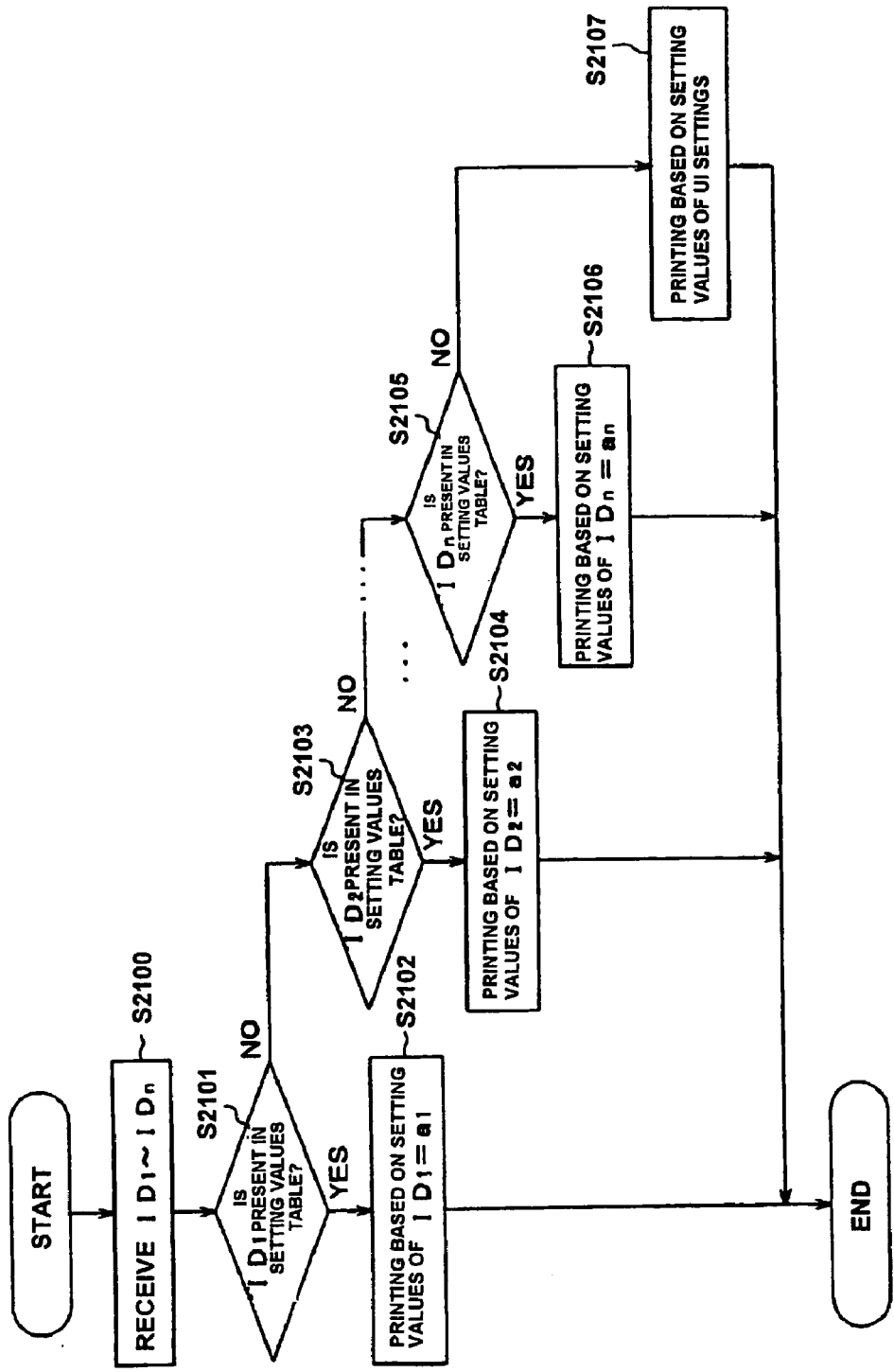
FIG. 19 is a flowchart of the processes that are executed when setting the print conditions.

Next, the flow of the processing of the CPU 12 when setting the print conditions is described using FIG. 19.

First, in step (hereinafter, written simply as S) 2100, the print information $D_b$, that is, the identifiers ID in the device identification information $D_a$, are received from the mobile device 2002. Here, the identifiers ID1, ID2, ..., IDn (in this example, n=4) are received as the model identification information, and are in the order of the hierarchy from the ID1 side. In this example, ID1=a1, ID2=a2, ID3=a3, and ID4=a4.

In S2101, the CPU 2012 determines whether or not the identifier ID1=a1 exists in the setting values table 2023. That is, first it determines whether or not there are print conditions based on the addresses of the setting values table 2023. Here, if the identifier ID1=a1 is present in the setting values table 2023, then the procedure advances to S2102, whereas if the identifier ID1=a1 is not present, then the procedure advances to S2103.

In S2102, the printing process is carried out based on the setting values (print conditions) that are set by the identifier ID1=a1 of the setting values table 2023.

In S2103, the CPU 2012 determines whether or not the setting values table 2023 includes the identifier ID2=a2. That is, it is determined whether or not there are print conditions based on the model names in the setting values table 2023. Here, if the setting values table 2023 includes the identifier ID2=a2, then the procedure advances to S2104.

In S2104, the printing process is executed based on the setting values set in the identifier ID2=a2 of the setting values table 2023.

On the other hand, when there is no identifier ID2=a2 in S2103, the same process as in S2101 and S2102 is repeated for identifiers ID3 and after. Then, if the setting values table 2023 does not include IDn-1, then the procedure advances to S2105.

In S2105, the CPU 2012 determines whether or not the setting values table 2023 includes the identifier IDn=an. Here, if the setting values table 2023 includes the identifier IDn=an, then the procedure advances to S2106. On the other hand, if it does not include the identifier IDn, then the procedure advances to S2107.

In S2106, the CPU 2012 executes printing based on the setting values set by the identifier IDn=an of the setting values table 2023.

In S2107, the CPU 2012 executes printing based on the setting values of the UI settings. That is, printing is executed using the setting values that were set for the printer 1 when the print information $D_b$ was received.

In this example, the identifiers ID are received when the print information $D_b$ is received from the mobile device 2002, and whether or not those identifiers ID are included in the setting values table 2023 of the ROM 2013 is determined. If an identifier ID is included in the setting values table 2023, then the setting values that are set by that identifier are taken as the print conditions and printing is executed based on those print conditions. Consequently, it is no longer necessary to set the print conditions at the printer 2001 after the print information $D_b$ has been received from the mobile device 2002, eliminating the nuisance that accompanied the task of setting the print conditions.

For example, when a user prints from their own mobile device 2002, the user wants printing to always be carried out under the same print conditions, and thus if he registers the address identifier ID1 of his mobile device 2002 to the printer 2001 in advance and sets the print conditions in relation to this, it becomes possible to always print out using the same print conditions. Also, the print conditions can also be set in model name, profile, and protocol units.

Also, at present, the functionality of some mobile devices 2002 is inadequate and does not allow the print conditions to be set on the mobile device 2002 side. In such cases, it is necessary to carry out the print settings on the printer 2001 side as discussed earlier in the background art section, and this task of setting was an inconvenience. However, since the print conditions can be set based on the identifiers ID that are sent from the mobile device 2002, the user does not need to set the print conditions on the printer 2001 himself, even with mobile devices 2002 such as these.

Consequently, with this embodiment, the following effects can be attained.

(1) Since the print conditions of the printer 2001 can be set based on the identifiers ID that are sent from the mobile device 2002, the need to set the print conditions at the printer 2001 after the print information $D_b$ is received can be obviated.

(2) A priority order is established for the address, model name, profile, and protocol, which are identifiers ID, and the print conditions are set in order from the high side of the priority order. Thus, even through there are a plurality of identifiers ID, one of the identifiers can be set as the identifier ID for determining the print conditions.

(3) Since the display screen 2020 of the printer 2001 indicates that the data are being received from the mobile data 2002, if there are a plurality of mobile devices 2002 around the printer 2001 then it is possible to know from which mobile device 2002 the data are being received.

(4) Given that the mobile device 2002 is a model that communicates with the printer 2001 wirelessly, many mobile devices 2002 may conceivably be connected to the printer 2001 at one time. In such a case, a significant amount of time would be required for printing if the print conditions were set on the printer 2001 side for each mobile device 2002, but since the print conditions are set using the identifiers ID from the mobile devices 2002, even if the above situation were to occur, it would not be time consuming to set the print conditions, allowing printing to be carried out smoothly.

It should be noted that the embodiment is not limited to the foregoing description, and may be altered to the following configurations.

MODIFIED EXAMPLE 1

Figure 20:
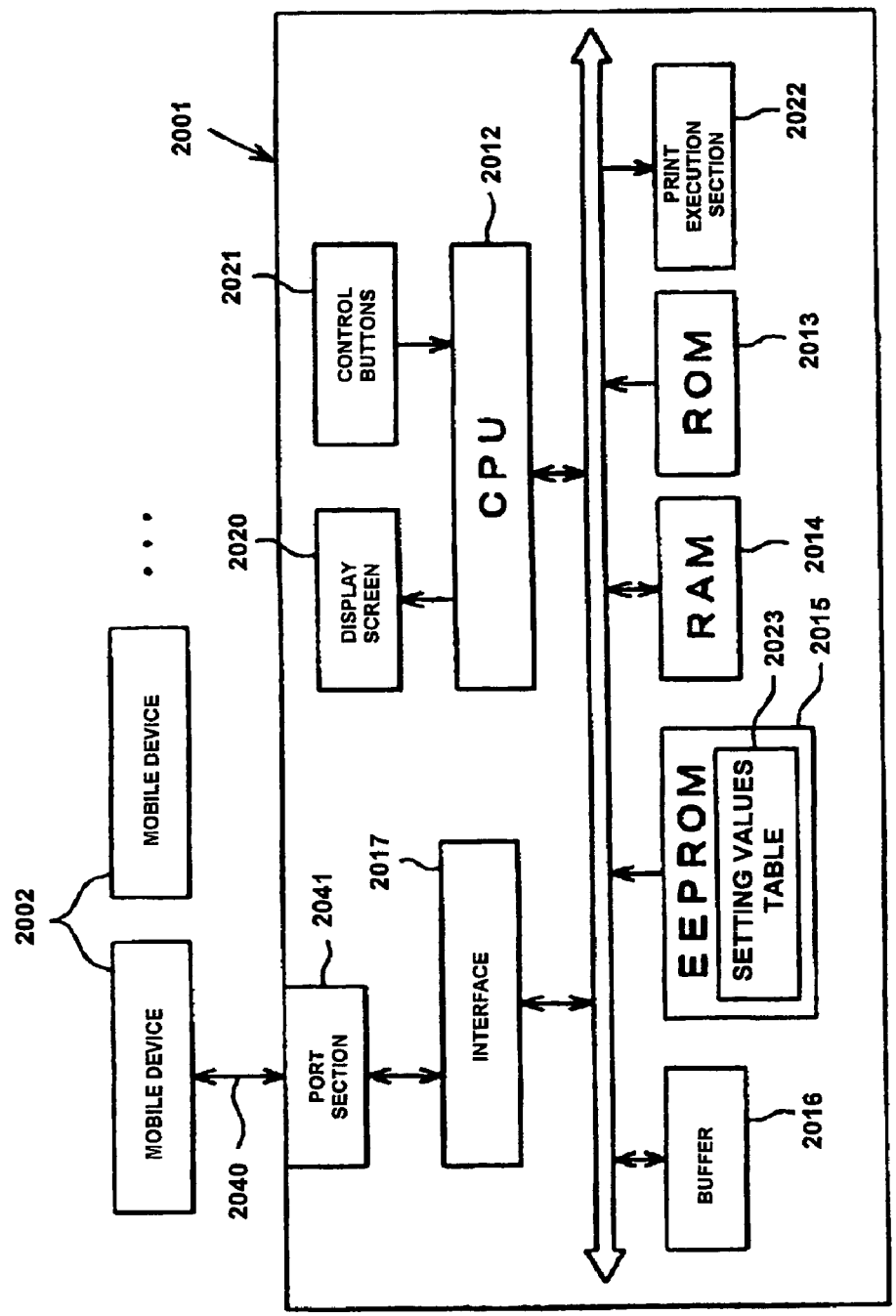
FIG. 20 is a diagram that schematically shows the configuration of a printer according to another example.

The method of communication between the printer 2001 and the mobile device 2002 is not limited to wireless communication. For example, as shown in FIG. 20, wired communication in which a cable 2040 extending from the mobile device 2002 is connected to a port section 2041 is also possible. In this case as well, it is not necessary to set the print conditions on the printer 2001 side after the print information $D_b$ is received from the mobile device 2002.

MODIFIED EXAMPLE 2

When setting the print conditions, there is no limitation to selecting the identifier ID for the address, model name, profile, and protocol in order from the top of the priority order. For example, any identifier ID of these may be chosen by the user by operating the control buttons 2021 of the printer 2001 so as to set the setting values that are determined from that identifier ID as the print conditions.

MODIFIED EXAMPLE 3

The mobile device 2002 address is not limited to a single address. For example, the address is made of several bytes, and by changing its end, a plurality of addresses can be provided. Then, it is also possible to select one predetermined address from the plurality of addresses at the mobile device 2002 and send that to the printer 2001 side in order to carry out printing. It should be noted that the same applies for the model name, the profile, and the protocol as well.

MODIFIED EXAMPLE 4

The communication information $D_0$ is not limited to inclusion of the print information $D_b$, and it may also include information other than the print information.

MODIFIED EXAMPLE 5

The identifiers ID are not limited to the address, model name, profile, and protocol, and can be other identifiers as well.

MODIFIED EXAMPLE 6

If the identifiers ID that are sent from the mobile device 2002 are not included in the setting values table 2023, it is also possible to keep that print information from being received. In this case, print information that is not approved can be kept from being received. At this time, notification that reception of the print information is not approved can be displayed on the display screen 2020.

MODIFIED EXAMPLE 7

In addition to character strings, the information displayed on the display screen 2020 while the print information $D_b$ is being received from the mobile device 2002 can also be icons. It is also possible to display "Editing Data" while the print information $D_b$ that are received by the printer 2001 are being converted into raster data. Moreover, the display screen 2020 may be a touch panel-type display screen.

MODIFIED EXAMPLE 8

The external device is not limited to the PDA 2003 or the portable telephone 2004, and it may also be a digital camera, for example, and there are no particular limitations to the device.

MODIFIED EXAMPLE 9

The communication format is not limited to Bluetooth when the printer 2001 and the mobile device 2002 communicate with one another wirelessly, and it is also possible to use other wireless communication formats as well.

MODIFIED EXAMPLE 10

The reproduction and output apparatus is not limited to the printer 2001. For example, the carry control device can also be a color filter manufacturing device for, e.g., a liquid crystal display, an electrode forming device for, e.g., an organic EL display or an FED (field emission display), an ejection device that ejects bioorganic material in order to manufacture biochips, and a manufacturing device for precision pipettes. Also, the printer 2001 is not limited to printing images, and it may also be used in a display for reproducing and displaying images.

The technical concepts that can be understood from the above embodiment and the separate examples are described below together with the effects thereof.

(1) Operation means for setting new recording conditions, or for setting the priority order of a plurality of identifiers, is provided.

(2) The setting means does not receive communication information if identifiers received from an external device are not included in the storage means.

(3) The plurality of identifiers are organized into a hierarchy according to their content, and the setting means sets the recording conditions based on a predetermined identifier of the plurality of identifiers.

(4) In the technical concept (3) discussed above, the identifiers in the hierarchy are given a priority order and the setting means sets the recording conditions based on that priority order.

(5) In the technical concepts (3) and (4) described above, a display control means displays a display item corresponding to the identifier on the display means in accordance with the identifier that is received from the external device.

(6) In the technical concepts (3) to (5) discussed above, the communications means communicates with the external device through wireless communication.

=Third Embodiment=

A third embodiment of the present invention is described below with reference to the drawings.

Figure 21:
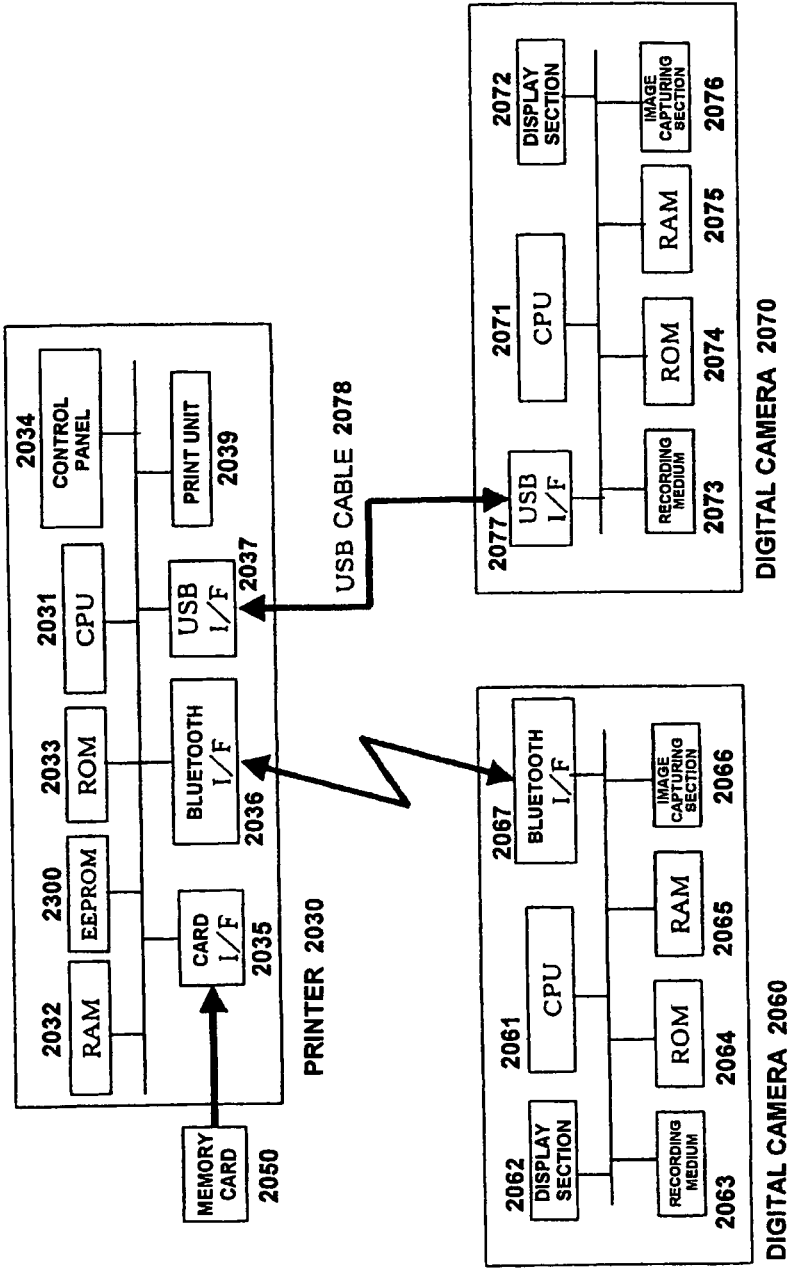
FIG. 21 is a diagram showing the overall configuration of an image reproduction system that adopts the present invention.

FIG. 21 is a diagram showing an example of the overall configuration of a print system (hereinafter, also referred to as "image reproduction system") 2100 in which the present invention has been adopted.

The image reproduction system 2100 overall includes a printer 2030 and digital cameras 2060 and 2070. The printer 2030 and the digital camera 2060 are connected by wireless communication through Bluetooth. Also, the printer 2030 and the digital camera 2070 are connected via a USB cable 2078. Moreover, the printer 2030 is configured so that a memory card 2050 can be inserted to and removed from it.

The printer 2030 as a whole includes a CPU 2031, a RAM 2032, a ROM 2033, a control panel 2034, a card interface (I/F) 2035, a Bluetooth I/F 2036, a USB I/F 2037, a print unit 2039, and an EEPROM 2300.

The CPU 2031 is connected to the RAM 2032, the ROM 2033, the control panel 2034, the card interface (I/F) 2035, the Bluetooth I/F 2036, the USB I/F 2037, the print unit 2039, and the EEPROM 20300 via an internal bus, reads out and executes various programs stored in the ROM 2033, and reads out print settings data indicating the print conditions (hereinafter, also referred to as "print reproduction conditions") stored in the EEPROM 2300 and processes images using those settings. This will be described in detail later. It should be noted that the CPU 2031 also functions as a print conditions setting section for setting the print conditions for the print data that are obtained through a reception section, and as is discussed later, the CPU 2031 sets the print conditions according to the content of pre-communications through the reception section.

The RAM 2032 functions as a working memory for when the CPU 2031 carries out processing, and temporarily stores various data. Also, the ROM 2033 stores various types of programs and data, for example, for the CPU 2031 to execute processing.

The control panel 2034 serves as a user interface for carrying out the various settings of the printer 2030, displays the data for the various print settings that are stored in the EEPROM 2300, for example, and by operating control buttons that are not diagramed, the print conditions (hereinafter, also referred to as "reproduction conditions") can be confirmed and the user can perform various desired settings, for example.

The card I/F (reception section) 2035 functions as an interface when the memory card 2050 has been inserted into the printer 2030, and converts the image data and the print settings data, for example, stored on the card 2050 into data that can be processed within the printer 2030 and outputs these data to the RAM 2032 or the CPU 2031. The card I/F 2035 is also configured so that it can read out and write the data stored in the RAM 2032 to the memory card 2050, for example.

The Bluetooth I/F (reception section) 2036 is an interface for carrying out wireless communication through Bluetooth. It is wirelessly connected to the digital camera 2060, and under control of the CPU 2031, it can send and receive commands and data in the Bluetooth standard. This will be described in detail later.

The USB I/F (reception section) 2037 is an interface that is connected to the digital camera 2060 through the USB cable 2078 and is for carrying out communication through USB. Similarly, under control of the CPU 2031, it can send and receive data, for example, in the USB standard. This will be described in detail later.

The print unit 2039 is for printing data that are to be printed, such as image data that have been input through the I/F 2035, 2036, or 2037, which serve as reception sections. The EEPROM 2300 stores the print settings data, that is, the print reproduction conditions, and stores different print settings data for each communications protocol of the external devices that are connected. The CPU 2031 reads out print settings data in accordance with the communications protocol of the external device that is connected and sets the optimal reproduction conditions for the connected device.

FIG. 22 shows an example of the print settings data, which indicate the reproduction conditions, stored in the EEPROM 2300. The reproduction conditions, in this example and shown in FIG. 22, are layout, print paper size, print paper type, and image processing. For example, in the case of a camera connected by USB cable, the layout is "one picture no border", the size is "L print", the type is "photograph paper", and the image processing is "APF" (Auto Photo Fine). In the case of BIP (Basic Imaging Profile) Bluetooth, the layout, size, type, and image processing are "one picture no border", "L print", "photograph paper", and "PIM" (Print Image Matching), and in the case of BPP (Basic Printing Profile) Bluetooth, these are "one picture with border", "A4", "normal paper", and "none", respectively. These will be described in detail later.

The configuration of the digital camera 2060 connected to the printer 2030 via Bluetooth is described next. The digital camera 2060 overall includes a CPU 2061, a display section 2062, a recording medium 2063, a ROM 2064, a RAM 2065, an image capturing section 2066, and a Bluetooth I/F 2067.

The CPU 2061 is connected, via an internal bus, to the display section 2062, the recording medium 2063, the ROM 2064, the RAM 2065, the image capturing section 2066, and the Bluetooth I/F 2067, and performs various processes such as storing images captured by the digital camera 2060 to the recording medium 2063 or the RAM 2065.

The display section 2062 is for the user to confirm the object to be captured. The recording medium 2063 is a memory card, for example, stores image data that have been captured and various types of data, for example, and can be attached and detached. The ROM 2064 stores various programs and data, and these are read by the CPU 2061 for executing processing with the CPU. The RAM 2065 temporarily stores execution data, for example, when the CPU 2061 executes processing. The image capturing section 2066 creates image data that can be processed within the camera 2060 by photoelectrically converting a target to be captured.

The Bluetooth I/F 2067 sends and receives commands and data in the Bluetooth standard through control of the CPU 2061. Image data captured by the camera 2060 are sent to the printer 2030 via the I/F 2067 under control of the CPU 2061. The specifics of this process are discussed later.

The configuration of the digital camera 2070 that is connected to the printer 2030 via the USB cable 2078 is described next. The digital camera 2070 has substantially the same configuration as the digital camera 2060, and overall is structured by a CPU 2071, a display section 2072, a recording medium 2073, a ROM 2074, a RAM 2075, an image capturing section 2076, and a USB I/F 2077. These are connected to one another via an internal bus.

The CPU 2071 processes images that have been captured, for example, and the display section 2072 is for the user to confirm an object to be captured. Also, the recording medium 2073 is for storing image data that have been captured and various other types of data, and the ROM 2074 stores programs for executing various processes, such as the process for capturing images. The RAM 2075 is for temporarily storing data when the CPU 2071 executes processes, and the image capture section 2076 photoelectrically converts an object to be captured, for example, and outputs it as image data.

The USB I/F 2077 is connected to the printer 2030 via the USB cable 2078 and sends and receives commands and data in the USB standard through control by the CPU 2071. This is discussed in detail later.

The overall operation, including setting the print conditions in the printer 2030, of the image reproduction system 2100 configured as above is described below.

Figure 23:
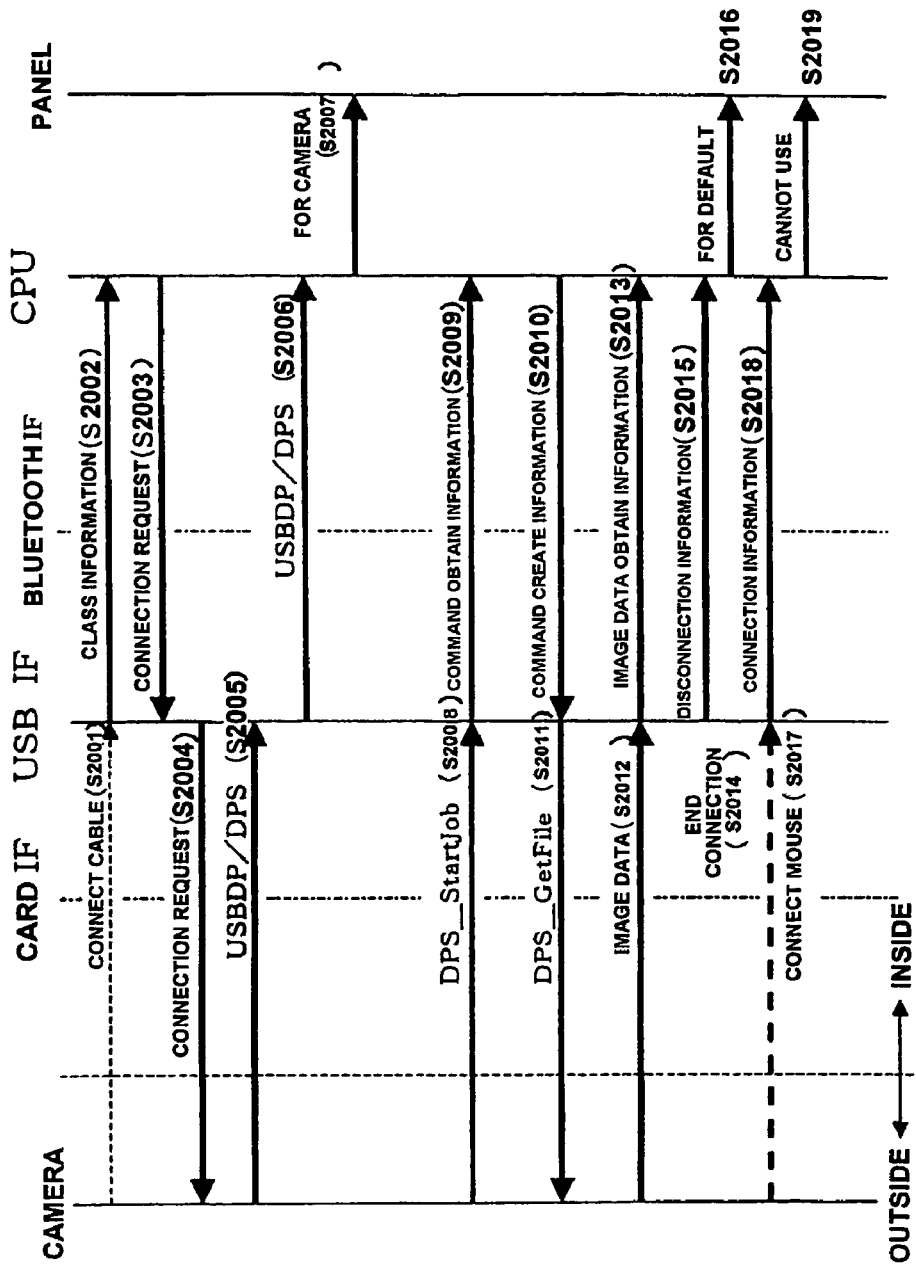
FIG. 23 is a timing chart for the printer that is connected via the USB cable.

FIG. 23 is a diagram showing an example of processing in which the present invention is employed through a timing chart. In the present invention, the print settings are changed depending on the type of the communications protocol of the external device (for example, a digital camera or a memory card) connected to the printer 2030, so as to attain optimal printing. FIG. 22 shows an example of a case where the digital camera 2070 is an external device that is connected to the printer 2030 via the USB cable 2078. It should be noted that as regards the print settings, the settings shown in FIG. 24 have been set as the default settings. FIG. 24 is an example of a print settings screen in which the default print settings data stored in the EEPROM 2300 of the printer 2030 are displayed on the control panel 2034 by a control of the CPU 2031.

The print settings, as shown in FIG. 24, are composed of a layout 2080, a paper size 2081, a paper type 2082, and image processing 2083. The layout 2080 indicates the layout in which images are to be printed to the print paper. The default settings are "one picture no border", that is, a layout indicating that an image is to be printed over the entire print paper.

The paper size 2081 indicates the size of the print paper. In the default settings shown in FIG. 24, it indicates that printing is carried out to "A4" print paper. The paper type 2082 indicates the type of the print paper, and in the example shown in FIG. 24, it indicates that printing is carried out to "photographic paper." The image processing 2083 indicates the processing to be performed, such as how to correct the image data, and in the example of FIG. 24, it indicates that images are to be processed by "Print Image Matching" (hereinafter, PIM).

Here, PIM is a processing method in which images are processed based on predetermined parameters before printing is carried out. Examples of parameters include color contrast (soft tone, hard tone, standard, etc.), brightness (bright, dark, standard, etc.), color balance (standard, weak, off, etc.), vividness (standard, high, weak, etc.), sharpness (standard, strong, weak, etc.), storage color (green, beige, red, etc.), and noise filtering (on, off). Desired image processing is performed using these parameters.

With PIM, accessory information for designating these parameters is transferred from the camera 2070 in a predetermined file format (Exif) in addition to the image data, and the printer 2030 processes images based on the parameters that are designated by the accessory information.

It should be noted that the print settings that are shown on the screen are only one example, and for example, as regards the layout, it is also possible to have borders, to print a plurality of images (or a plurality of the same image) on a single sheet of paper, and to combine these (for example, two pictures with borders). Also, the paper size, in addition to A4, may also be A3 or B5 defined by the JIS standard or any other paper size. Also, the paper type may be normal paper or matte, for example, in addition to photographic paper. Also, the image processing can be Auto Photo Fine (image correction in which the image is given a sepia tone, for example) in addition to PIM.

These default settings are stored on the EEPROM 2300 of the printer 2030 in advance, and when the USB cable 2078 is connected to the printer 2030, the printer switches to the print settings (reproduction conditions) for the camera connected to the USB cable 2078, and those settings become the print settings that match the print conditions of the camera 2070 connected via the USB cable 2078.

It should be noted that the default settings are the settings when the card 2050 is inserted into the printer 2030 and connection to the printer 2050 through the USB cable 2078 or wireless communication through Bluetooth is not performed. Also, when the card 2050 has been inserted and image data, for example, are communicated via the USB cable 2078 or via Bluetooth, the reproduction conditions are switched to correspond to the communication protocol. This is because the card 2050 is not necessarily inserted into the printer 2030 for the purpose of printing and may also be inserted in order to read or write various types of data.

The process from connection of the USB cable 2078 to the printer 2030 through the switching of the print settings up to obtaining a print output is described with reference to FIG. 23.

As shown in FIG. 23, when the USB cable 2078 is connected to the printer 2030 (step S2001), then class information is output from the USB I/F 2037 to the CPU 2031 (step S2002). The class information includes information on the type of device that is connected through the cable 2078, and, for example, includes information indicating whether the digital camera 2070 is connected or a mouse is connected. In the present example, class information including information that indicates that the digital camera 2070 has been connected is output to the CPU 2031 (step 2002). As a result, the printer 2030 recognizes that the digital camera 2070 has been connected via the USB cable 2078.

Then, the CPU 2031 outputs to the USB I/F 2037 a connection request requesting connection of the protocol (step S2003).

The USB I/F 2037 outputs this connection request to the digital camera 2070 over the USB cable 2078 (step S2004). The digital camera 2070 receives this information and outputs information specifically indicating the communication protocol through which data will be output from the USB I/F 2077 (see FIG. 16) to the CPU 2071. Then, the CPU 2071 reads information on the communication protocols stored in the ROM 2074, for example, and outputs a control signal to the USB I/F 2077 so that the USB I/F 2077 outputs this information to the printer 2010. For example, in the case of communication through the DPS (Direct Print Service) protocol, information indicating that the protocol is the DPS protocol is output, and in the case of communication through the USB DIRECT-PRINT protocol, information indicating that the protocol is the USB DIRECT-PRINT protocol is output.

Here, the DPS protocol is a protocol in which control information for printing out image data is output to the printer 2030 via the cable 2078 as a series of script written in a markup language (here this is XML: eXtensible Markup Language), and based on that information, the printer 2030 prints the image data that are sent from the digital camera 2070. The control information may be job condition settings information including information on the paper type, paper size, and quality information, and image output information including information on the number of prints and the object ID of the image data, for example. This is described in greater detail later.

Returning to FIG. 23, the USB I/F 2077 that has received this outputs information indicating that data or commands will be transferred to the printer 2030 via the USB cable 2078 by way of the DPS protocol or the USB DIRECT-PRINT protocol (step S2005).

The USB I/F 2037 of the printer 2030 that has received this information outputs to the CPU 2031 information indicating that communication with the digital camera 2070 will be carried out using the DPS protocol or the USB DIRECT-PRINT protocol (step S2006). By doing this, the printer 2030 recognizes that communication with the digital camera 2070 will be performed through the DPS protocol or the USB DIRECT-PRINT protocol.

Then, the CPU 2031 reads the print settings data for the camera (USB connected) stored in the EEPROM 2300 and then processes the image data subsequently input from the digital camera 2070 using these setting conditions, carrying out printing. Also, the CPU 2031 outputs a control signal to the control panel 2034 so that a switch is made to the settings screen for the camera (USB connected). Consequently, the screen of the panel 2034 is switched to the settings screen for the camera (USB connected). FIG. 25 shows an example of the settings screen that is displayed on this screen.

This settings screen shows "one picture no border" for the layout 2080, "L print" for the paper size 2081, "photographic paper" for the paper type 2082, and "Auto Photo Fine" for the image processing. Since this information is stored in the EEPROM 2300 in advance, when information on the specific communications protocol is received (step S2006), this information is read out and displayed by the CPU 2031. Then, based on the settings information, image processing is performed with respect to the image data that are subsequently sent, allowing printing to be achieved.

Returning to FIG. 23, data are exchanged between the digital camera 2070 and the printer 2030 based on information on the communications protocol type that is obtained in step S2006, and in the following, an example in which processing is carried out through DPS is described. First, the digital camera 2070 outputs a DPS_StartJob command to the printer 2030 (step S2008). In this command, more specifically, the control information for the image data described above is expressed in XML, and the script is output to the printer 2030.

An example of the XML is shown in FIG. 26. The script shows XML version information, for example, followed by the tag <start Job Request> indicating that this is the command, below which a tag <job> specifying a single job is arranged. Then, below this are stored job conditions setting information and image output information through two tags <jobconfig> and <printinfo>.

In the example of FIG. 26, the job conditions setting information, for example, includes the tag <quality> relating to the quality information, the tag <papersize> relating to the paper size information, the tag <paperType> relating to the paper type information, the tag <fileType> relating to the file format of the image that is sent, the tag <date> relating to information on whether or not to print the date information, the tag <fileName> relating to information on whether or not to print the file path information, the tag <imageoptimize> relating to information on whether or not to optimize the image, and the tag <layoutItem> indicating the page layout information.

The tag <quality> is a tag for designating information on the quality of the image that is to be printed, such as standard, draft, or fine. The tag <papersize> is a tag for designating information for designating the paper size of the print paper in the job, such as A4 size. The tag <paperType> is a tag for designating information on the paper type in the job, such as standard paper or photographic paper. The tag <fileType> is a tag for designating information on the image format in the job, such as EXIF, JPEG, TIFF, or GIF.

Also, the tag <date> is a tag for designating whether or not to print the date information designated in printinfo. The tag <fileName> is a tag for designating whether or not to print the file path information that is designated in printinfo. The tag <imageOpt imize> is a tag for designating image optimization settings information that indicates whether or not to optimize the image. The tag <layoutItem> is a tag for designating the page layout in the job.

Also, the tag <printinfo> is a tag for designating the image print information, and below it is the tag <image> for designating the image to be output. Then, below that are the two tags <imageID> and <imageDate>. The tag <imageID> designates the object ID of the image data to be printed, and the tag <imageDate> is for designating the date to be printed to the side of the image. The object ID is used by the camera 2070 and the printer 2030 to specify the image data that are sent. Returning to FIG. 23, when the USB I/F 2037 receives DPS_StartJob, the USB I/F 2037 outputs command obtain information indicating that this command has been received to the CPU 2031 (step S2009).

Next, the CPU 2031 outputs to the USB I/F 2037 a control signal (create information) for creating a file obtain command DPS_GetFile in XML script through the DPS protocol (step S2010). When the USB I/F 2037 receives this, it outputs the DPS_GetFile command (step S2011). An example of the DPS_GetFile expressed in XML script is shown in FIG. 26.

The tag <getFileRequest> is a tag indicating that this is the file obtain command. Below it are arranged two tags, <fileID> and <buffPtr>. The tag <fileID> is a tag for designating the object ID of the file in which the image data to be obtained are stored, and shows which image data of the IDs sent in DPS_StartJob the printer 2030 is actually attempting to obtain. The tag <buffPtr> is a tag for designating the pointer of the buffer (for example, the RAM 2032) that is used to receive the file that is obtained.

The USB I/F 2037 outputs this DPS_GetFile command to the camera 2070 (step S2011). The CPU 2071 of the digital camera 2070 that receives this command reads the image data file of the ID specified by the tag <fileID> from the recording medium 2073 or the RAM 2075 and outputs it from the USB I/F 2077 to the printer (step S2012).

Next, when the USB I/F 2037 of the printer 2030 receives this image data, it outputs image data obtain information to the CPU 2031 (step S2013), and under command of the CPU 2031, temporarily stores the image data in the RAM 2032, for example, and performs image processing such as color correction or halftone processing based on the print settings read from the EEPROM 2300 (see FIG. 7). Then, the data that have been subjected to image processing are output to the print unit 2039 and the image that was actually transmitted from the digital camera 2070 is printed (reproduced).

Then, when the USB cable 2078 is removed, disconnecting it from the printer 2030 (step S2014), the USB I/F 2037 outputs to the CPU 2031 disconnection information indicating that the USB cable 2078 has been disconnected (step S2015). With the USB cable 2078, information indicating that communication has been interrupted is output when communication is interrupted, and thus when the cable 2078 is removed, information indicating that communication has been interrupted is output.

Then, in order to switch the settings for the camera (USB connected), which were set in step S7, to the default settings, the CPU 2031 reads the default print settings data stored in the EEPROM 2300 and uses these print settings to execute subsequent printing. Then, by the CPU 2031 performing control so that those reproduction conditions are displayed on the control panel 2034, a default settings screen is displayed.

It should be noted the printer 2030, after switching the print settings to the print settings for a USB connected camera, does not change the print settings for the USB connected camera to the card print settings (in this case, the default settings) or the print settings for Bluetooth until the cable 2078 is removed from the printer 2030, even when the memory card 2050 is inserted into the printer 2030 or communication is carried out through Bluetooth. Conversely, after changing to the print settings for Bluetooth, those settings stay unchanged until communication via Bluetooth is finished, even if the USB cable 2078 or the memory card 2050 are inserted.

Also, as shown in FIG. 23, when a mouse is connected by the USB cable 2078 instead of the digital camera 2070, the class information includes information indicating that the device is a mouse, and thus when the CPU 2031 receives this class information it displays a screen indicating that use is not possible on the screen of the control panel 2034.

Next, the operation from when switching to the Bluetooth print settings as described above up to carrying out printing is described with reference to FIG. 28. Here, the USB cable 2078 is not connected to the printer 2030. Also, as mentioned above, communication via Bluetooth is given priority and the print settings are switched to the print settings for Bluetooth even if the memory card 2050 is inserted into the printer 2030.

First, an Inquiry command showing confirmation of connection is sent from the digital camera 2060 (step S2020). For communication through Bluetooth, first, the device showing the request for connection outputs this Inquiry command. Then, of the plurality of devices within the range that the command can be received, if a device desires to communicate with the device that actually sent the command, then it sends a response to this command to the device that sent the Inquiry command, establishing connection. Consequently, if none of the plurality of devices are to connect with the device that has output the Inquiry command, then no response is output even if the command is received, and a communications connection is not established. It should be noted that the Inquiry command includes device specific address information, and in the example shown in FIG. 28, the address information of the digital camera 2060 is included.

The Bluetooth I/F 2036 of the printer 2030 that has received this command outputs to the CPU 2031 reception information indicating that the Inquiry command has been received (step S2021). The CPU 2031, to establish connection with the digital camera 2060, reads the address of the printer 2030 that is stored in the ROM 2033 and outputs to the Bluetooth I/F 2036 a control signal for creating a Response command (step S2021).

The Bluetooth I/F 2036 receives this control signal and outputs a Response command that includes the address information of the printer 2030 (step S2022). By doing this, communication via Bluetooth is established between the digital camera 2060 and the printer 2030, and it subsequently becomes possible to actually send and receive image data, for example. The Bluetooth I/F 2067 of the digital camera 2060 that receives the Response command outputs information indicating that it has received the command to the CPU 2061. Then, the CPU 2061 controls the Bluetooth I/F 2067 so that a Service Discovery command is output to the printer 2030.

The Response to the Inquiry is only information related to the address of the other party, and whether the other party is a portable telephone or a printer, and moreover, which profile (BIP or BPP, for example) can be used to allow communication via Bluetooth, are not known. Accordingly, information on the other party is obtained by sending this Service Discovery command.

Here, Bluetooth is constituted by various profiles, and depending on the profile, the commands and data that can be sent and received are different. BIP and BPP are both Bluetooth profiles. BIP is a standard profile for forwarding image data, and BPP is a profile with which, for example, data for performing various controls with respect to the image data that are forwarded can also be forwarded.

As regards the information on the print settings, in BIP there is only the data size (number of pixels per frame and the amount of data in byte units) and the encoding information (whether the image data are GIF, bitmap, or JPEG, for example). On the other hand, in BPP, various information such as the paper size and the formats supported (such as post script printing, XHTML printing, PDF, etc.) can be sent and received. In the present invention, the print settings are changed depending on the profile, and based on those settings, images are processed and printed and the print settings screen that is displayed on the control panel 2034 is also switched.

Returning to FIG. 29, the Bluetooth I/F 2036 of the printer 2030 that has received the Service Discovery command from the digital camera 2060 (step S2023) outputs to the CPU 2031 confirmation information indicating that the command has been received (step S2024). Then, the CPU 2031 reads the information on the profiles supported by the printer 2030 from the ROM 2033, for example, and outputs a control signal to the Bluetooth I/F 2036 so that a Response command in response to the Service Discovery command is transmitted (step S2025).

Next, the Bluetooth I/F 2036 outputs a Response command including information on supported profiles to the digital camera 2060 (step S2026). If the printer 2030 supports BIP, then a Response command including information that it supports BIP is returned.

The Bluetooth I/F 2067 of the digital camera 2060 that receives this outputs information indicating that it has received the command to the CPU 2061. Then, the CPU 2061 outputs a control signal to the Bluetooth I/F 2067 so that an OBEX (OBject EXchange) Connect command is output to the printer 2030 in order for the image data to be sent to the printer 2030 at the OBEX protocol level.

Here, the OBEX protocol constitutes a sub-protocol below BIP and BPP, and is a protocol, for instance, in which when image data are actually transmitted, all image data are transmitted by repeating the process of transmitting the image data from the camera 2060 to the printer 2030 in predetermined packet units, and then returning a Response command to the camera 2060 from the printer 2030 for each packet that is received. Commands or the like with the same content in both BIP and BPP are sent and received at the OBEX protocol level. For that reason, these commands are output in order to request that data are sent and received through OBEX.

Next, the Bluetooth I/F 2067 of the digital camera 2060 outputs an OBEX Connect command to the printer 2030 (step S2027). It should be noted that this command includes a packet indicating the profiles supported by the digital camera 2060. For example, if commands etc. are to be sent and received in BIP, then a packet including information that the protocol is BIP is output.

The Bluetooth I/F 2036 of the printer 2030 that has received the OBEX Connect command outputs to the CPU 2031 information indicating that the command has been received. This information includes information indicating that exchange is to be performed through BIP. Then, the CPU 2031 confirms that the protocol is BIP and changes the print settings to those for BIP. That is, the CPU 2031 reads out data (see FIG. 22) for the print settings in BIP from the EEPROM 2033 and subsequently processes images based on those settings. Then, to display the print settings data that are read out on the control panel 2034, it performs control for displaying the print settings data that are read out. The print settings screen that is displayed as the default screen is then switched to the print settings screen for BIP.

Figure 28:
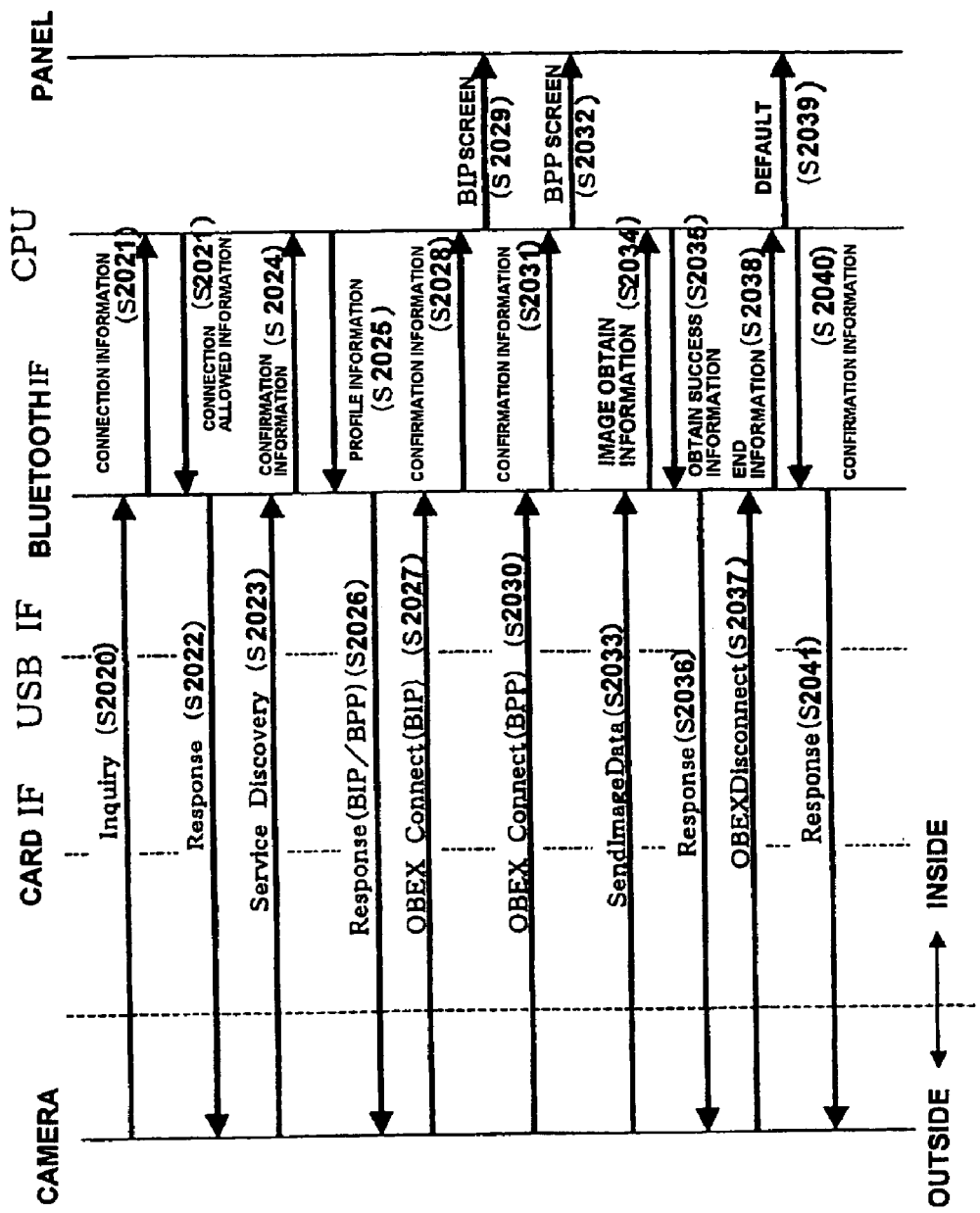
FIG. 28 is a timing chart of the printer in the case of Bluetooth.

FIG. 28 shows an example of the print settings screen for BIP that is displayed on the control panel 2034. The print settings data, like the data that are displayed on the default screen (FIG. 24) and on the camera (USB connected) screen (FIG. 25), include the layout 2080, the paper size 2081, the paper type 2082, and the image processing 2083. In the example shown in FIG. 29, the layout 2080 is "one picture no border," the paper size 2081 is "L print," the paper type 2082 is "photographic paper," and the image processing 2083 is "Print Image Matching." It should be noted that "Bluetooth Photograph Screen" is displayed to the user on the actual display screen.

On the other hand, when a Response command indicating that BPP is supported is sent from the printer 2030 in step S2026 and a packet including information that BPP is supported is sent as the OBEX Connect command (step S2030), then, in the same manner as above, the Bluetooth I/F 2036 outputs information indicating that the protocol is BPP, together with confirmation information, to the CPU 2031 (step S2031).

Then, the CPU 2031 reads the BPP print settings data (see FIG. 22) from the EEPROM 2033 and subsequently processes the image data that are transmitted from the digital camera 2060 in accordance with these print settings for BPP. The CPU 2031 also controls the control panel 2034 so as to display the print settings data that are read out on the control panel 2034, displaying the BPP screen shown in FIG. 30 (step S2032).

FIG. 30 is an example of the BPP print settings screen, and the layout 2080 is "one picture with border", the paper size 2081 is "A4", the paper type 2082 is "normal paper", and the image processing 2083 is "none." An image processing of "none"indicates that correction of the color contrast, for example, is not performed by the printer 2030 with respect to the image data.

Next, the image data are sent from the digital camera 2060 (step S2033). The Bluetooth I/F 2036 of the printer 2030 that receives the image data outputs to the CPU 2031 obtain information indicating that the image data have been received. The CPU 2031 then controls the Bluetooth I/F 2036 and the RAM 2032 so that the image data that are received are temporarily stored in the RAM 2032.

The CPU 2031 next outputs a control signal to the Bluetooth I/F 2036 so that it sends to the digital camera 2060 a Response command indicating that the image data have been received (step S2035). The Bluetooth I/F 2036 that receives this creates and outputs a Response command (step S2036).

Then, when the digital camera 2060 has transmitted all of a series of image data, it outputs an OBEX Discconect command to the printer 2030 so as to end communication via Bluetooth (Step S2037).

The Bluetooth I/F 2036 of the printer 2030 that has received this command outputs to the CPU 2031 information indicating that the OBEX Disconnect command has been received. Then, to return the print settings to the default settings, the CPU 2031 reads the default print settings data stored in the EEPROM 2300 and carries out subsequent image processing using those settings. Moreover, so as to display the default print settings data that are read out on the control panel 2034, the CPU 2031 outputs a control signal to the panel 2034 (step S2039), making it display the print settings screen shown in FIG. 24.

Next, to output a Response command indicating that the OBEX Disconnect command has been received to the digital camera 2060, the CPU 2031 outputs a control signal to the Bluetooth I/F 2036 (step S2040), making the Bluetooth I/F 2036 output the Response command to the digital camera 2060 (step S2041). With this, the sequence of sending and receiving image data via Bluetooth is ended.

As described above, since print settings data are stored in the EEPROM 2300 in advance and those settings are changed according to the communications protocol of the device that is connected to the printer 2030, optimal printing can be achieved.

It should be noted that the digital cameras 2060 and 2070 were described as the devices connected to the printer 2030 in the example discussed above, but other possibilities for devices include portable information terminals such as portable telephones and PDAs (Personal Digital Assistance).

Also, although the reproduction conditions were different depending on the type of the communications protocol, it is also possible for reproduction conditions to be different depending on the type of the device that is connected as well. Furthermore, a case in which the reproduction conditions are switched based on the combination of the type of the communications protocol and the type of the connected device is also conceivable.

For example, the reproduction conditions can be switched for a camera employing BIP and a PDA employing BIP, and there can be different reproduction conditions for a camera employing DPS and a PDA employing DPS.

What is claimed is:

1. A printing method comprising:
   a step of performing bidirectional pre-communication with an external device before print data are obtained from said external device;
   a step of obtaining print data from said external device;
   a step of setting a print condition according to the content of said bidirectional pre-communication; and
   a step of printing on a medium based on said print data according to said print condition that has been set, wherein
   a reception unit for receiving said print data is specified from among a plurality of reception units depending on the content of said bidirectional pre-communication, and
   said reception unit is a logic channel that has been set logically.

2. A printing method according to claim 1, wherein said print condition is set according to the reception unit that is specified.

3. A printing method according to claim 2, wherein said reception unit receives print data from said external device either wirelessly or via a wire.

4. A printing method according to claim 2, wherein in said bidirectional pre-communication, information for designating said reception unit is received from said external device, and
   wherein said print condition is set in accordance with said information for designating said reception unit that is received.

5. A printing method according to claim 4, wherein a lookup table correlating said reception unit and said print condition is prepared, and
   wherein said print condition is set based on said lookup table and said information for designating said reception unit that is received.

6. A printing method according to claim 4, wherein said information for designating said reception unit is an identifier of said reception unit, and
   wherein said print condition is set in accordance with said identifier that is received.

7. A printing method according to claim 6, wherein said identifier of said reception unit is sent to said external device before said information for designating said reception unit is received from said external device.

8. A printing method according to claim 2, wherein at least one operation of
   an operation of carrying the medium,
   an operation of ejecting liquid onto said medium, or
   an operation of a carriage
   is set in accordance with said reception unit that has received said print data.

9. A printing method according to claim 2, wherein printing is carried out on said medium based on pixel data that are created based on said print data, and
   wherein said pixel data are created based on said print data according to said print condition that has been set in accordance with said reception unit that has received said print data.

10. A printing method according to claim 1, wherein said logic channel is set in compliance with a transfer format that is used when receiving data from said external device.

11. A printing method according to claim 10, wherein said transfer format is at least one of
    a profile for transferring text data or
    a profile for transferring image data.

12. A printing method according to claim 1, wherein said print condition is prepared for each identifier;
    wherein at least one identifier is obtained from said external device; and
    wherein said print condition is chosen from said print condition that has been prepared in advance based on the identifier that is received from said external device.

13. A printing method according to claim 12, wherein a plurality of said identifiers are arranged in a hierarchy according to their content;
    wherein a priority order is set for said identifiers arranged in the hierarchy; and
    wherein said print condition is selected based on said priority order.

14. A printing method according to claim 13, wherein at least one of a protocol identifier, a profile identifier, a model name identifier, and a unique address identifier is obtained from said external device, and
    wherein based on said identifier that is received from said external device, a print condition is selected from said print conditions prepared in advance.

15. A printing method according to claim 14, wherein the hierarchy is arranged such that the priority order of said protocol identifier is lowest.

16. A printing method according to claim 14, wherein the hierarchy is arranged such that the priority order of said unique address identifier is highest.

17. A printing method according to claim 1, wherein a communications protocol is specified in accordance with the content of said bidirectional pre-communication, and
    wherein said print condition is set in accordance with said communications protocol that has been specified.

18. A printing method according to claim 17, wherein a different print condition is set for a Direct Print Service protocol of a Universal Serial Bus, a Basic Imaging Profile of Bluetooth, and a Basic Printing Profile of Bluetooth.

19. A printing method according to claim 17, further comprising:
    a step of displaying a predetermined print condition on a screen;
    a step of, when said print condition is set in accordance with said communications protocol that has been specified, displaying said print condition that has been set on said screen in place of said predetermined print condition; and
    a step of displaying said predetermined print condition on said screen in place of said print condition that has been set after printing has been carried out on a medium based on said print data in accordance with said print condition that has been set.

20. A printing apparatus comprising:
  a reception section for receiving data from an external device, wherein said reception section is a logic channel that has been set logically, and carries out bidirectional pre-communication with said external device before obtaining print data from said external device;
  a print condition setting section for setting a print condition for print data obtained by said reception section, wherein said print condition setting section sets a print condition in accordance with the content of said bidirectional pre-communication; and
  a print head for printing on a medium based on said print data in accordance with said print condition that has been set.

* * * * *